US010205656B2

(12) United States Patent
Lin et al.

(10) Patent No.: US 10,205,656 B2
(45) Date of Patent: Feb. 12, 2019

(54) METHOD AND APPARATUS FOR UPDATING MANNER OF PROCESSING PACKET OF SERVICE FLOW

(71) Applicant: Huawei Technologies Co., Ltd., Shenzhen (CN)

(72) Inventors: Junru Lin, Shenzhen (CN); Lehong Niu, Shenzhen (CN); Hongyu Li, Shenzhen (CN); Jing Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 51 days.

(21) Appl. No.: 15/393,444

(22) Filed: Dec. 29, 2016

(65) Prior Publication Data
US 2017/0111267 A1 Apr. 20, 2017

Related U.S. Application Data

(63) Continuation of application No. PCT/CN2015/080983, filed on Jun. 8, 2015.

(30) Foreign Application Priority Data

Jul. 3, 2014 (CN) .......................... 2014 1 0315759

(51) Int. Cl.
*H04L 12/721* (2013.01)
*H04L 12/851* (2013.01)
*H04L 29/06* (2006.01)

(52) U.S. Cl.
CPC .............. *H04L 45/38* (2013.01); *H04L 29/06* (2013.01); *H04L 47/2483* (2013.01)

(58) Field of Classification Search
CPC ..................... H04L 45/38; H04L 47/2483
See application file for complete search history.

(56) References Cited

U.S. PATENT DOCUMENTS 8,743,690 B1 * 6/2014 Janarthanan ............ H04L 47/31
370/235
2010/0103837 A1 * 4/2010 Jungck .............. H04L 29/12066
370/252
(Continued)

FOREIGN PATENT DOCUMENTS

CN 101030940 A 9/2007
CN 101360097 A 2/2009
(Continued)

OTHER PUBLICATIONS

Parol et al., Towards networks of the future: SDN paradigm introduction to PON networking for business applications, IEEE, Proceedings of the 2013 Federated Conference on Computer Science and Information Systems, Sep. 8-11, 2013, pp. 829-836.*

Primary Examiner — Shailendra Kumar
(74) Attorney, Agent, or Firm — Slater Matsil, LLP

(57) ABSTRACT

This application discloses a method and an apparatus for updating a manner of processing a packet of a service flow. The method includes a first packet of the service flow is forwarded by using a first service function chain (SFC). A control node obtains a flow identifier and indication information from a service function (SF) node of the first SFC, where the indication information is used to indicate a manner of processing a second packet of the service flow, the flow identifier is used to identify the service flow. The control node obtains the manner of processing the second packet according to the indication information, and sends the flow identifier and the manner of processing the second packet to the processing node, where the manner of processing the second packet does not include forwarding the second packet along the first SFC.

20 Claims, 10 Drawing Sheets

(56) References Cited

U.S. PATENT DOCUMENTS

| | | | |
|---|---|---|---|
| 2010/0132031 A1* | 5/2010 | Zheng | H04L 63/0227 726/13 |
| 2011/0211579 A1 | 9/2011 | Cao et al. | |
| 2011/0235588 A1* | 9/2011 | Xu | H04L 45/04 370/328 |
| 2011/0320580 A1 | 12/2011 | Zhou et al. | |
| 2014/0052836 A1* | 2/2014 | Nguyen | H04L 45/306 709/223 |
| 2014/0098669 A1* | 4/2014 | Garg | H04L 45/38 370/235 |
| 2014/0334303 A1* | 11/2014 | Ma | H04W 28/0268 370/235 |
| 2015/0207675 A1* | 7/2015 | Hayashi | H04L 45/38 370/225 |
| 2015/0341271 A1* | 11/2015 | Cortes Gomez | H04L 41/042 370/236 |

FOREIGN PATENT DOCUMENTS

| | | |
|---|---|---|
| CN | 101635676 A | 1/2010 |
| CN | 101753419 A | 6/2010 |
| CN | 101841797 A | 9/2010 |
| CN | 103428101 A | 12/2013 |

\* cited by examiner

METHOD AND APPARATUS FOR UPDATING MANNER OF PROCESSING PACKET OF SERVICE FLOW

CROSS-REFERENCE TO RELATED APPLICATIONS

This application is a continuation of International Application No. PCT/CN2015/080983, filed on Jun. 8, 2015, which claims priority to Chinese Patent Application No. 201410315759.9, filed on Jul. 3, 2014. The disclosures of the aforementioned applications are hereby incorporated by reference in their entireties.

TECHNICAL FIELD

The present embodiments relate to communications technologies, and in particular, to a method for updating a manner of processing a packet of a service flow, a service function (SF) node, a service forwarding entity (SFE), a processing node, and a control node.

BACKGROUND

On a common network such as a data center network or the Internet (Internet), a common network device can provide basic forwarding functions such as switching and routing, and can further provide a value-added service (VAS). A VAS may be a service function such as network address translation (NAT), a firewall, traffic balancing, or deep packet inspection (DPI).

One or more service function chains (SFC) may be deployed on a common network. An identifier (ID) of each SFC may be indicated by using a path identifier (path ID), and the SFC may sequentially include a first SF node and a second SF node. The first SF node and the second SF node may provide different VAS processing, for example, the first SF node provides a firewall function, and the second SF node provides a DPI function. The first SF node may communicate with a first SFE on the network, the first SFE communicates with both a service classifier (service classifier) and a second SFE, and the second SFE may communicate with the second SF node.

For example, the service classifier adds an SFC header to a received first packet, so as to obtain a second packet, the service classifier adds a path ID to an SFC header of the second packet according to a service to which the first packet belongs, and the service classifier sends the second packet to the first SFE. The first SFE sends the second packet to the first SF node according to the path ID in the SFC header of the second packet. The first SF node detects whether the second packet is from a trusted user, and if the second packet is from a trusted user, the first SF node sends the second packet to the first SFE. The first SFE may send, to the second SFE, the second packet sent by the first SF node, and the second SFE sends the second packet to the second SF node. Each packet that belongs to a same service flow as that to which the first packet belongs is from a trusted user, and when forwarded by using the SFC, each packet of the service flow is detected by the first SF node, thereby resulting in network resource waste.

SUMMARY

In view of this, embodiments provide a method for updating a manner of processing a packet of a service flow, which can adjust, according to a result of processing a packet of a service flow by an SF node, a manner of processing the service flow.

The embodiments further provide a control node, an SF node, a processing node, and an SFE.

Technical solutions provided in the embodiments are as follows:

According to a first aspect, a method for updating a manner of processing a packet of a service flow is provided, where a first packet of the service flow is forwarded by using a first SFC, and the method includes obtaining, by a control node, a flow identifier and indication information from an SF node of the first SFC, where the indication information is used to indicate a manner of processing a second packet of the service flow, the flow identifier is used to identify the service flow, and the second packet reaches a processing node later than the first packet. The method also includes obtaining, by the control node according to the indication information, the manner of processing the second packet, where the manner of processing the second packet does not include forwarding the second packet along the first SFC and sending, by the control node, the flow identifier and the manner of processing the second packet to the processing node.

In a first possible implementation manner of the first aspect, the obtaining, by a control node, a flow identifier and indication information from an SF node of the first SFC includes: receiving, by the control node, a Diameter (Diameter) protocol packet sent by the SF node, where an attribute value pair (AVP) included in a Diameter header of the Diameter protocol packet carries the flow identifier and the indication information; and obtaining, by the control node, the flow identifier and the indication information from the AVP of the Diameter header.

With reference to the first aspect, a second possible implementation manner of the first aspect is further provided, where the control node is an SFE, the SFE is connected to the SF node, and the first packet includes an SFC header; and the obtaining, by a control node, a flow identifier and indication information from an SF node of the first SFC includes: receiving, by the SFE, a third packet sent by the SF node, where the third packet carries the SFC header to which the indication information is added; and obtaining, by the SFE, the flow identifier and the indication information from the third packet.

With reference to the first aspect, a third possible implementation manner of the first aspect is further provided, where the control node is a controller; and the obtaining, by a control node, a flow identifier and indication information from an SF node of the first SFC includes: receiving, by the controller, a first OpenFlow (OF) protocol packet sent by an SFE, where a payload in the first OF protocol packet carries the flow identifier and the indication information, and the SFE is connected to the SF node; and obtaining, by the controller, the flow identifier and the indication information from the payload of the first OF protocol packet.

With reference to the first aspect or any possible implementation manner of the first aspect, a fourth possible implementation manner of the first aspect is further provided, where the obtaining, by the control node according to the indication information, the manner of processing the second packet includes: determining, by the control node, a service type of the service flow according to the indication information; and obtaining, by the control node, an ID of a second SFC according to the service type of the service flow, where the second SFC is used to forward the second packet.

With reference to the first aspect or any possible implementation manner of the first aspect, a fifth possible implementation manner of the first aspect is further provided, where the obtaining, by the control node according to the indication information, the manner of processing the second packet includes: determining, by the control node, a processing instruction for the second packet according to the indication information, where the processing instruction is to discard the second packet or skip the SF node.

With reference to the first aspect or any possible implementation manner of the first aspect, a sixth possible implementation manner of the first aspect is further provided, where the processing node is a service classifier; and the sending, by the control node, the flow identifier and the manner of processing the second packet to the processing node includes: obtaining, by the control node, a second OF protocol packet, where a payload in the second OF protocol packet carries the flow identifier and the manner of processing the second packet; and sending, by the control node, the second OF protocol packet to the service classifier.

According to a second aspect, a method for updating a manner of processing a packet of a service flow is provided, where a first packet of the service flow is forwarded by using a first SFC, and the method includes receiving, by an SF node on the first SFC, a first packet sent by an SFE, where the SFE is connected to the SF node, the first packet includes a flow identifier, and the flow identifier is used to identify the service flow. The method also includes processing, by the SF node, the first packet to obtain indication information, where the indication information is used to indicate a manner of processing a second packet of the service flow, the manner of processing the second packet of the service flow does not include forwarding the second packet along the first SFC, and the second packet reaches a processing node later than the first packet. Additionally, the method includes sending, by the SF node, the flow identifier and the indication information to a control node.

In a first possible implementation manner of the second aspect, the sending, by the SF node, the flow identifier and the indication information to a control node includes: obtaining, by the SF node, a Diameter protocol packet, where an AVP included in a Diameter header of the Diameter protocol packet carries the flow identifier and the indication information; and sending, by the SF node, the Diameter protocol packet to the control node.

With reference to the second aspect, a second possible implementation manner of the second aspect is further provided, where the first packet includes an SFC header; and the sending, by the SF node, the flow identifier and the indication information to a control node includes: obtaining, by the SF node, a third packet, where the third packet carries the SFC header to which the indication information is added; and sending, by the SF node, the third packet to the SFE, where the SFE is the control node, or the SFE is connected to the control node.

With reference to the second aspect, the first possible implementation manner of the second aspect, or the second possible implementation manner of the second aspect, a third possible implementation manner of the second aspect is further provided, where the indication information is a service type of the service flow, the service type is used to determine a second SFC, and the second SFC is used to forward the second packet.

With reference to the second aspect, the first possible implementation manner of the second aspect, or the second possible implementation manner of the second aspect, a fourth possible implementation manner of the second aspect is further provided, where the indication information corresponds to a processing instruction for the second packet, and the processing instruction is to discard the second packet or skip the SF node.

According to a third aspect, a method for updating a manner of processing a packet of a service flow is provided, where a first packet of the service flow is forwarded by using a first SFC, and the method includes: obtaining, by a processing node from a control node, a flow identifier and a manner of processing a second packet, where the flow identifier is used to identify the service flow; receiving, by the processing node, the second packet of the service flow, where the second packet reaches the processing node later than the first packet; and after determining that the second packet includes the flow identifier, processing, by the processing node, the second packet according to the manner of processing the second packet, where the manner of processing the second packet does not include forwarding the second packet along the first SFC.

In a first possible implementation manner of the third aspect, the obtaining, by a processing node from a control node, a flow identifier and a manner of processing a second packet includes: receiving, by the processing node, an OF protocol packet, where a payload in the OF protocol packet carries the flow identifier and the manner of processing the second packet; and obtaining, by the processing node from the payload of the OF protocol packet, the flow identifier and the manner of processing the second packet.

With reference to the third aspect or the first possible implementation manner of the third aspect, a second possible implementation manner of the third aspect is further provided, where the processing node is a service classifier, and the manner of processing the second packet is to add, to the second packet, an SFC header that carries an ID of a second SFC; and the processing, by the processing node, the second packet according to the manner of processing the second packet includes: adding, by the service classifier to the second packet, the SFC header that carries the ID of the second SFC; and sending, by the service classifier to an SFE, a packet obtained after the SFC header has been added, where the SFE is connected to the service classifier.

With reference to the third aspect or the first possible implementation manner of the third aspect, a third possible implementation manner of the third aspect is further provided, where the manner of processing the second packet is to skip an SF node, and the SF node is connected to the processing node; and the processing, by the processing node, the second packet according to the manner of processing the second packet includes: skipping, by the processing node, the SF node, and sending the second packet to a next-hop node, where the next-hop node is an SFE or a next SF node of the SF node on the first SFC, and the SFE is connected to both the processing node and the next SF node of the SF node on the first SFC.

According to a fourth aspect, a method for updating a manner of processing a packet of a service flow is provided, where a first packet of the service flow is forwarded by using a first SFC, and the method includes: receiving, by an SFE, a flow identifier and indication information that are sent by an SF node of the first SFC, where the indication information is used to indicate a manner of processing a second packet of the service flow, and the flow identifier is used to identify the service flow; and sending, by the SFE, the flow identifier and the indication information to a controller.

In a first possible implementation manner of the fourth aspect, the sending, by the SFE, the flow identifier and the indication information to a controller includes: obtaining, by the SFE, an OF protocol packet, where a payload in the OF protocol packet carries the flow identifier and the indication information; and sending, by the SFE, the OF protocol packet to the controller.

According to a fifth aspect, a control node is provided, where a first packet of a service flow is forwarded by using a first SFC, and the control node includes: a first obtaining unit, configured to obtain a flow identifier and indication information from an SF node of the first SFC, where the flow identifier is used to identify the service flow, the indication information is used to indicate a manner of processing a second packet of the service flow, and the second packet reaches a processing node later than the first packet; a second obtaining unit, configured to obtain, according to the indication information, the manner of processing the second packet, where the manner of processing the second packet does not include forwarding the second packet along the first SFC; and a sending unit, configured to send the flow identifier and the manner of processing the second packet to the processing node.

In a first possible implementation manner of the fifth aspect, the control node further includes a first receiving unit, where the first receiving unit receives a Diameter protocol packet sent by the SF node, where an AVP included in a Diameter header of the Diameter protocol packet carries the flow identifier and the indication information; and the first obtaining unit is specifically configured to obtain the flow identifier and the indication information from the AVP of the Diameter header.

With reference to the fifth aspect, a second possible implementation manner of the fifth aspect is further provided, where the control node is an SFE, the SFE is connected to the SF node, and the first packet includes an SFC header; the SFE further includes a first receiving unit, where the first receiving unit is configured to receive a third packet sent by the SF node, where the third packet carries the SFC header to which the indication information is added; and the first obtaining unit is specifically configured to obtain the flow identifier and the indication information from the third packet.

With reference to the fifth aspect, a third possible implementation manner of the fifth aspect is further provided, where the control node is a controller; the controller further includes a second receiving unit, where the second receiving unit is configured to receive a first OF protocol packet sent by an SFE, where a payload in the first OF protocol packet carries the flow identifier and the indication information, and the SFE is connected to the SF node; and the first obtaining unit is specifically configured to obtain the flow identifier and the indication information from the payload of the first OF protocol packet.

With reference to the fifth aspect or any possible implementation manner of the fifth aspect, a fourth possible implementation manner of the fifth aspect is further provided, where the second obtaining unit is specifically configured to determine a service type of the service flow according to the indication information; and the second obtaining unit is specifically configured to obtain an ID of a second SFC according to the service type of the service flow, where the second SFC is used to forward the second packet.

With reference to the fifth aspect or any possible implementation manner of the fifth aspect, a fifth possible implementation manner of the fifth aspect is further provided, where the second obtaining unit is specifically configured to determine a processing instruction for the second packet according to the indication information, where the processing instruction is to discard the second packet or skip the SF node.

With reference to the fifth aspect or any possible implementation manner of the fifth aspect, a sixth possible implementation manner of the fifth aspect is further provided, where the processing node is a service classifier; the control node further includes a third obtaining unit, where the third obtaining unit is configured to obtain a second OF protocol packet, where a payload in the second OF protocol packet carries the flow identifier and the manner of processing the second packet; and the sending unit is specifically configured to send the second OF protocol packet to the service classifier.

According to a sixth aspect, an SF node is provided, where a first packet of a service flow is forwarded by using a first SFC, and the SF node includes: a receiving unit, configured to receive the first packet sent by an SFE, where the SFE is connected to the SF node, the first packet includes a flow identifier, and the flow identifier is used to identify the service flow; a processing unit, configured to process the first packet to obtain indication information, where the indication information is used to indicate a manner of processing a second packet of the service flow, the manner of processing the second packet of the service flow does not include forwarding the second packet along the first SFC, and the second packet reaches a processing node later than the first packet; and a sending unit, configured to send the flow identifier and the indication information to a control node.

In a first possible implementation manner of the sixth aspect, the SF node further includes a first obtaining unit, where the first obtaining unit is configured to obtain a Diameter protocol packet, where an AVP included in a Diameter header of the Diameter protocol packet carries the flow identifier and the indication information; and the sending unit is specifically configured to send the Diameter protocol packet to the control node.

With reference to the sixth aspect, a second possible implementation manner of the sixth aspect is further provided, where the first packet includes an SFC header; the SF node further includes a second obtaining unit, where the second obtaining unit is configured to obtain a third packet, where the third packet carries the SFC header to which the indication information is added; and the sending unit is specifically configured to send the third packet to the SFE, where the SFE is the control node or the SFE is connected to the control node.

According to a seventh aspect, a processing node is provided, where a first packet of a service flow is forwarded by using a first SFC, and the processing node includes: an obtaining unit, configured to obtain, from a control node, a flow identifier and a manner of processing a second packet, where the flow identifier is used to identify the service flow; a first receiving unit, configured to receive the second packet of the service flow, where the second packet reaches the processing node later than the first packet; and a processing unit, configured to: after determining that the second packet includes the flow identifier, process the second packet according to the manner of processing the second packet, where the manner of processing the second packet does not include forwarding the second packet along the first SFC.

In a first possible implementation manner of the seventh aspect, the processing node further includes a second receiving unit, where the second receiving unit is configured to receive an OF protocol packet, where a payload in the OF protocol packet carries the flow identifier and the manner of processing the second packet; and the obtaining unit is specifically configured to obtain, from the payload of the OF protocol packet, the flow identifier and the manner of processing the second packet.

With reference to the seventh aspect or the first possible implementation manner of the seventh aspect, a second possible implementation manner of the seventh aspect is further provided, where the processing node is a service classifier, and the manner of processing the second packet is to add, to the second packet, an SFC header that carries an ID of a second SFC; and the processing node further includes a sending unit, where the processing unit is specifically configured to add, to the second packet, the SFC header that carries the ID of the second SFC; and the sending unit is configured to send, to an SFE, a packet obtained after the SFC header has been added, where the SFE is connected to the service classifier.

With reference to the seventh aspect or the first possible implementation manner of the seventh aspect, a third possible implementation manner of the seventh aspect is further provided, where the manner of processing the second packet is to skip an SF node, and the SF node is connected to the processing node; and the processing node further includes a sending unit, where the sending unit is configured to skip the SF node, and send the second packet to a next-hop node, where the next-hop node is an SFE or a next SF node of the SF node on the first SFC, and the SFE is connected to both the processing node and the next SF node of the SF node on the first SFC.

According to an eighth aspect, an SFE is provided, where a first packet of a service flow is forwarded by using a first SFC, and the SFE includes: a receiving unit, configured to receive a flow identifier and indication information that are sent by an SF node of the first SFC, where the flow identifier is used to identify the service flow; and a sending unit, configured to send the flow identifier and the indication information to a controller, where the indication information is used to indicate a manner of processing a second packet of the service flow.

In a first possible implementation manner of the eighth aspect, the SFE further includes an obtaining unit, where the obtaining unit is configured to obtain an OF protocol packet, where a payload in the OF protocol packet carries the flow identifier and the indication information; and the sending unit is specifically configured to send the OF protocol packet to the controller.

According to the foregoing solutions, an SF node in the present embodiments may send indication information to a control node, where the indication information is information used to indicate a manner of processing a second packet. The control node may obtain, according to the indication information, the manner of processing the second packet, where the manner of processing the second packet does not include forwarding the second packet along a first SFC. The control node may send a flow identifier and the manner of processing the second packet to a processing node. The processing node may adjust, according to the manner of processing the second packet, a manner of processing a second packet of a service flow. Because the manner of processing the second packet does not include forwarding the second packet along the first SFC, the second packet of the service flow is no longer forwarded along the first SFC, which helps adjust, according to the indication information obtained by the SF node, the manner of processing the second packet of the service flow.

BRIEF DESCRIPTION OF THE DRAWINGS

To describe the technical solutions in the embodiments more clearly, the following briefly describes the accompanying drawings required for describing the embodiments. Apparently, the accompanying drawings in the following description show merely some embodiments, and ordinary persons skilled in the art may still derive other drawings from these accompanying drawings.

DETAILED DESCRIPTION OF ILLUSTRATIVE EMBODIMENTS

To make the objectives, technical solutions, and advantages of the embodiments clearer, the following clearly describes the technical solutions in the embodiments with reference to the accompanying drawings in the embodiments. Apparently, the described embodiments are some rather than all of the embodiments. All other embodiments obtained by persons of ordinary skill in the art based on the embodiments of the present embodiments shall fall within the protection scope.

Figure 1:
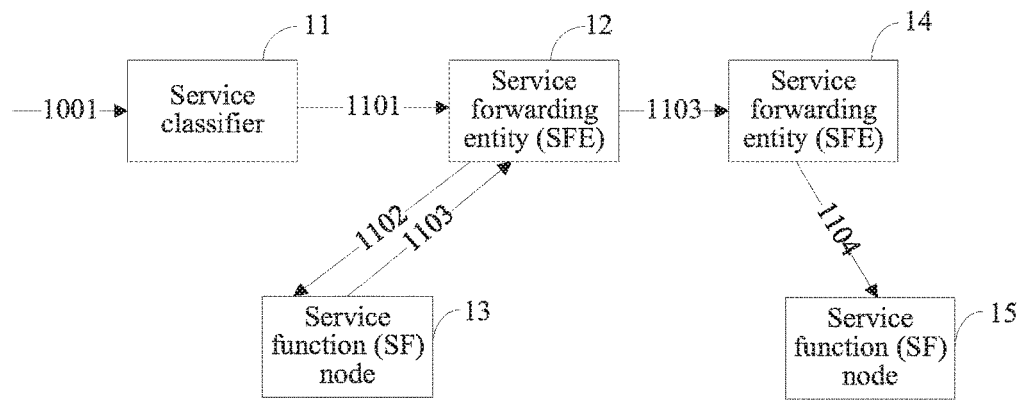
FIG. 1 is a schematic diagram of a network scenario.

FIG. 1 is a schematic diagram of a network scenario. In a network shown in FIG. 1, an SFC includes an SF node 13 and an SF node 15, where the SF node 13 is connected to an SFE 12, the SF node 15 is connected to an SFE 14, and the SFE 12 is further connected to both the SFE 14 and a service classifier 11. The network shown in FIG. 1 includes one SFC. The SFC includes the SF node 13 and the SF node 15, and the SF node 13 is a first SF node of the SFC. A path ID may be used to identify the SFC.

A flow table entry configured for the service classifier 11 may include a flow identifier and a path ID. The flow identifier may be at least one of a protocol type, a source Internet Protocol (IP) address, a destination IP address, a source User Datagram Protocol (UDP) port, a destination UDP port, a source Transmission Control Protocol (TCP) port, or a destination TCP port.

After receiving a packet 1001 from a user, the service classifier 11 obtains a flow identifier from the packet 1001. The service classifier 11 obtains a path ID according to the flow identifier and a flow table entry. The service classifier 11 adds an SFC header to the packet 1001, so as to obtain a packet 1101, where the SFC header in the packet 1101 includes the path ID and an ID of the service classifier 11, the SFC header of the packet 1101 corresponds to the SFC identified by the path ID, and the SFC header of the packet 1101 is used to guide the SFE 12 to forward the packet 1101. The service classifier 11 sends the packet 1101 to the SFE 12 according to the path ID.

The SFE 12 receives the packet 1101, and the SFE 12 determines a first forwarding entry according to the path ID and the ID of the service classifier 11 that are included in the SFC header of the packet 1101, where the first forwarding entry includes the path ID, the ID of the service classifier 11, and an ID of the SF node 13. The SFE 12 may replace, with the ID of the SF node 13, the ID of the service classifier 11 that is included in the SFC header of the packet 1101, so as to obtain a packet 1102. The SFE 12 sends the packet 1102 to the SF node 13 according to the first forwarding entry.

The SF node 13 may perform service processing on the packet 1102, so as to obtain a packet 1103, where the packet 1103 may be the same as the packet 1102 or may be different from the packet 1102. For example, if a service function configured for the SF node 13 is a firewall function, the SF node 13 may determine, according to the flow identifier included in the packet 1102, that the packet 1102 is from a trusted user. That is, a service flow to which the packet 1001 belongs is from the trusted user. The SF node 13 sends the packet 1103 to the SFE 12.

The SFE 12 receives the packet 1103 from the SF node 13. The SFE 12 determines a second forwarding entry according to the path ID and the ID of the SF node 13 that are included in an SFC header of the packet 1103, where the second forwarding entry includes the path ID, the ID of the SF node 13, and an ID of the SFE 14. The SFE 12 sends the packet 1103 to the SFE 14 according to the second forwarding entry.

The service classifier 11 receives again a packet that belongs to the same service flow as that to which the packet 1001 belongs, and processes the packet of the service flow in a manner of processing the packet 1001. In this way, the packet that belongs to the same service flow as that to which the packet 1001 belongs is still processed by the SF node 13. If the packet 1001 is from a trusted user, a packet included in the service flow to which the packet 1001 belongs is from the trusted user. However, the SF node 13 needs to detect each packet included in the service flow, thereby wasting a network resource. A node in the network shown in FIG. 1 cannot adjust, according to information about processing a packet by an SF node, a manner of processing the service flow to which the packet belongs.

In view of the foregoing problem, a method is provided to resolve that a node in a network cannot adjust, according to information about processing a packet by an SF node, a manner of forwarding the packet. In the method, an SF node of a first SFC receives a first packet of a service flow that is sent by an SFE, where the first packet includes a flow identifier, the flow identifier is used to identify the service flow, and the first packet may be forwarded along the first SFC. The SF node processes the first packet, so as to obtain indication information, where the indication information is information used to indicate a manner of processing a second packet, and the second packet reaches a processing node later than the first packet. The SF node sends the flow identifier and the indication information to a control node. After obtaining the flow identifier and the indication information from the SF node of the first SFC, the control node obtains, according to the indication information, the manner of processing the second packet, where the manner of processing the second packet does not include forwarding the second packet along the first SFC. The control node sends the flow identifier and the manner of processing the second packet to the processing node. The processing node may process the second packet of the service flow according to the flow identifier and the manner of processing the second packet. The ID mentioned in the embodiments may be information such as a character, a character string, a name, or an index. The indication information in the embodiments is information used to indicate a manner of processing a second packet, and is not described one by one in the following embodiments. This solution may be implemented by using the following several embodiments.

Embodiment 1

Figure 2:
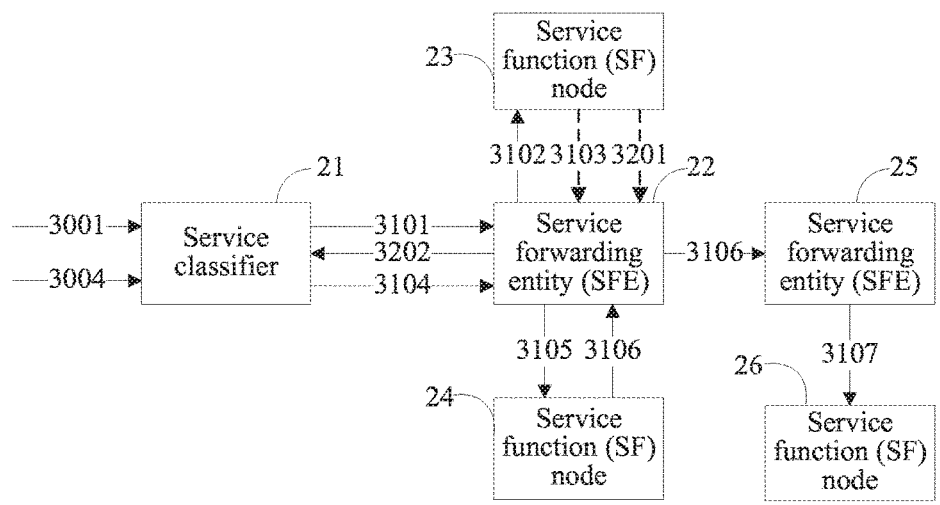
FIG. 2 is a schematic diagram of a network scenario according to Embodiment 1.

FIG. 2 is a schematic diagram of a network scenario according to Embodiment 1. A network shown in FIG. 2 includes a first SFC and a second SFC. SF nodes included in the first SFC are not completely the same as SF nodes included in the second SFC. As shown in FIG. 2, the first SFC includes an SF node 23 and an SF node 26, and the second SFC includes an SF node 24 and the SF node 26. In the network shown in FIG. 2, a service classifier 21 is connected to an SFE 22, the SFE 22 is further connected to the SF node 23, the SF node 24, and an SFE 25, and the SFE 25 is connected to the SF node 26. In the network shown in FIG. 2, a packet 3001 and a packet 3004 belong to a same service flow, and the packet 3004 reaches the service classifier 21 later than the packet 3001. The service classifier 21 first sends a packet 3101 to the SFE 22, and then sends a packet 3104 to the SFE 22. In the network shown in FIG. 2, the SFE 22 is a control node, and the service classifier 21 is a processing node. In Embodiment 1, an example in which the SF node 23 may send indication information to the SFE 22 is used for description. If the processing node is the service classifier 21, a second packet may be the packet 3004 shown in FIG. 2. If the SF node 24 sends indication information to the SFE 22, the second packet may be a packet received by the service classifier 21 after the packet 3004. If the SF node 26 sends indication information to the SFE 25, the second packet is a packet received by the service classifier 21 after the packet 3004. The SF node 24 and/or the SF node 26 may also send, by using a method used by the SF node 23, indication information to an SFE connected to the SF node 24 and/or the SF node 26, and details are not described herein.

Figure 3:
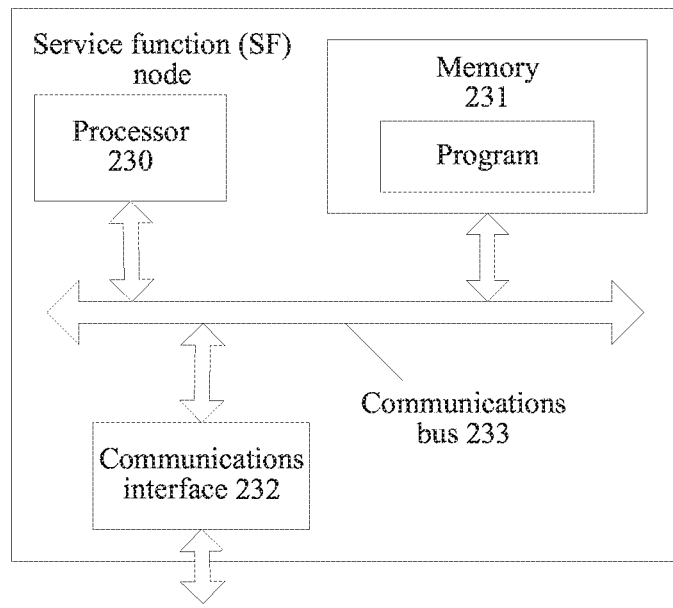
FIG. 3 is a schematic diagram of an SF node according to Embodiment 1.

FIG. 3 is a schematic diagram of an SF node according to Embodiment 1. An SF node shown in FIG. 3 may be the SF node 23, the SF node 24, or the SF node 26 in the network shown in FIG. 2. The SF node shown in FIG. 3 may be a logical module, where the logical module and an SFE that is connected to the SF node may be deployed on a same device. For example, the SF node 23 and the SFE 22 are deployed on one physical device, the SF node 24 and the SFE 22 are deployed on one physical device, and the SF node 26 and the SFE 25 are deployed on one device. Alternatively, the SF node shown in FIG. 3 may be a physical device, and the physical device may be connected to an SFE.

The SF node shown in FIG. 3 may include: a processor 230, a memory 231, and a communications interface 232. The processor 230, the memory 231, and the communications interface 232 are connected by using a communications bus 233. The processor 230 includes at least one physical processor, and the communications interface 232 includes at least one physical interface. The memory 231 is configured to store a program.

The processor 230 performs the following operations according to an executable instruction included in the program read from the memory 231.

The processor 230 receives, by using the communications interface 232, a first packet sent by a connected SFE, where the first packet includes a flow identifier, and the flow identifier is used to identify a service flow to which the first packet belongs. The flow identifier may include at least one of an Ethernet destination address, an Ethernet source address, a source IP address, a destination IP address, a source UDP port, a destination UDP port, a source TCP port, a destination TCP port, a protocol number, an ID of a virtual local area network (VLAN), a Multiprotocol Label Switching (MPLS) label, or an Internet Protocol version 6 (IPv6) flow label (flow label). The flow identifier may further include another parameter used to identify the service flow to which the first packet belongs, and examples are not listed one by one herein. If the SF node is the SF node 23 shown in FIG. 2 and the SFE is the SFE 22 shown in FIG. 2, the first packet is a packet 3102.

The processor 230 processes the first packet, so as to obtain indication information. A second packet and the first packet belong to the same service flow. If a processing node is the service classifier 21 shown in FIG. 2, the second packet is the packet 3004 shown in FIG. 2; or if a processing node is the SFE 22 shown in FIG. 2, the second packet is the packet 3104 shown in FIG. 2.

For example, the indication information may be first information or second information. The first information is used to determine a service type of the service flow, for example, the first information may be a uniform resource locator (URL) address of an application, an application type, or an application layer protocol type. The application type may be video, file transfer (file transfer), Voice over Internet Protocol (VoIP), point-to-point service (P2P), or the like. The application layer protocol type may be Hypertext Transfer Protocol (HTTP), File Transfer Protocol (FTP), Simple Mail Transfer Protocol (SMTP), Post Office Protocol 3 (POPS), Telecommunication Network Protocol (Telnet), Internet Relay Chat (IRC), or the like. The second information is used to determine an action instruction for the service flow, for example, discarding the second packet or skipping the SF node shown in FIG. 3.

The processor 230 sends the flow identifier and the indication information to a control node by using the communications interface 232. For example, the control node may be the SFE 22 in the network shown in FIG. 2.

Figure 4:
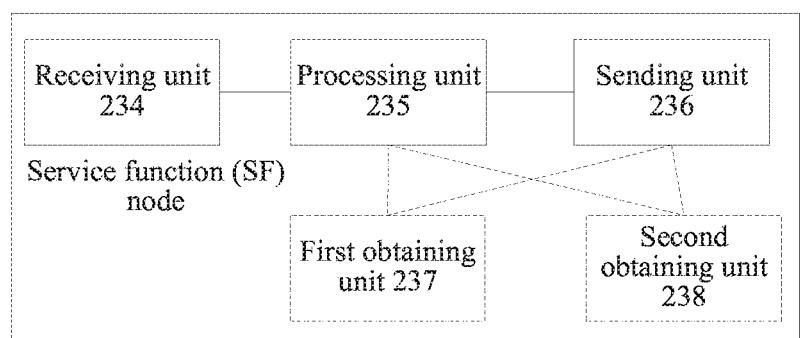
FIG. 4 is a schematic diagram of an SF node according to Embodiment 1.

FIG. 4 is a schematic diagram of an SF node according to Embodiment 1. The SF node shown in FIG. 4 includes: a receiving unit 234, a processing unit 235, and a sending unit 236. Optionally, the SF node shown in FIG. 4 further includes a first obtaining unit 237 and/or a second obtaining unit 238.

The SF node shown in FIG. 4 and the SF node shown in FIG. 3 may be a same apparatus, for example, both are the SF node 23, the SF node 24, or the SF node 26 in the network shown in FIG. 2. It may be considered that FIG. 3 shows, from a physical perspective, content included in an SF node, and FIG. 4 shows, from a logical perspective, content included in an SF node. Optionally, the receiving unit 234 and the sending unit 236 shown in FIG. 4 may be implemented by the communications interface 232 shown in FIG. 3; and the processing unit 235, the first obtaining unit 237, and the second obtaining unit 238 shown in FIG. 4 may be implemented by the processor 230 shown in FIG. 3 according to the executable instruction stored in the memory 231.

Figure 5:
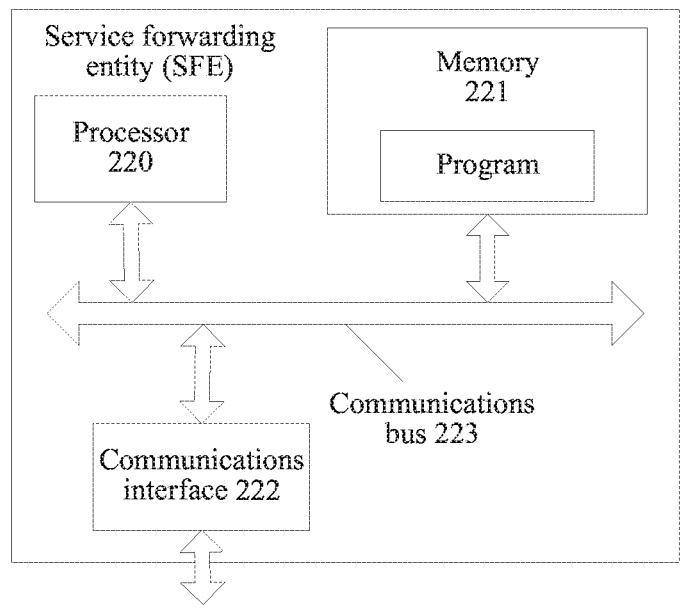
FIG. 5 is a schematic diagram of an SFE according to Embodiment 1.

FIG. 5 is a schematic diagram of an SFE according to Embodiment 1. The SFE shown in FIG. 5 may be the SFE 22 or the SFE 25 in the network shown in FIG. 2. The SFE shown in FIG. 5 may be a logical module, where the SFE and an SF node connected to the SFE may be deployed on one device. For example, the SFE 22, an SF node 23, and an SF node 24 may be deployed on one physical device, and the SFE 25 and an SF node 26 may be deployed on one physical device. Alternatively, the SFE and a service classifier connected to the SFE may be deployed on one device, for example, the SFE 22 and a service classifier 21 may be deployed on one physical device. Alternatively, the SFE shown in FIG. 5 may be a physical device. For example, a device on which the SFE 22 is located may be connected to the service classifier 21, a device on which the SF node 23 is located, a device on which the SF node 24 is located, and a device on which the SFE 25 is located, and the device on which the SFE 25 is located may be connected to a device on which the SF node 26 is located.

The SFE shown in FIG. 5 may include: a processor 220, a memory 221, and a communications interface 222. The processor 220, the memory 221, and the communications interface 222 are connected by using a communications bus 223. The processor 220 includes at least one physical processor, and the communications interface 222 includes at least one physical interface.

The memory 221 is configured to store a program and a correspondence, where the correspondence may include indication information and a manner of processing a second packet. Optionally, the memory 221 may be further configured to store a first forwarding entry, a second forwarding entry, and a third forwarding entry. The first forwarding entry includes an ID of a first SFC, an ID of the service classifier 21, and a next hop, and the next hop of the first forwarding entry includes an ID of the SF node 23. The second forwarding entry includes an ID of a second SFC, the ID of the service classifier 21, and a next hop, and the next hop of the second forwarding entry includes an ID of the SF node 24. The third forwarding entry includes the ID of the second SFC, the ID of the SF node 24, and a next hop, and the next hop included in the third forwarding entry includes an ID of the SFE 25.

The processor 220 performs the following operations according to an executable instruction included in the program read from the memory 221.

The processor 220 obtains a flow identifier and indication information from an SF node of the first SFC by using the communications interface 222. The first SFC is used to forward a first packet, for example, a path corresponding to the first SFC shown in FIG. 2 may be used to forward the packet 3101. The flow identifier is used to identify a service flow to which the first packet belongs. A second packet and the first packet belong to the same service flow. The second packet reaches a processing node later than the first packet. For example, if the processing node is the service classifier 21, the second packet may be the packet 3004 shown in FIG. 2; or if the processing node is the SFE 22, the second packet may be the packet 3104 shown in FIG. 2.

The processor 220 obtains, according to the indication information, a manner of processing the second packet, where the manner of processing the second packet may be the ID of the second SFC or an action instruction. The second SFC is used to forward the second packet, for example, the second SFC may be the second SFC shown in FIG. 2. The action instruction may be to discard the second packet or skip an SF node, where the SF node may be a node that sends the indication information to the SFE shown in FIG. 5.

The processor 220 may send the flow identifier and the manner of processing the second packet to the processing node, where the processing node may be the service classifier 21 shown in FIG. 2. Alternatively, the processing node may be an SFE used as a control node.

Figure 6:
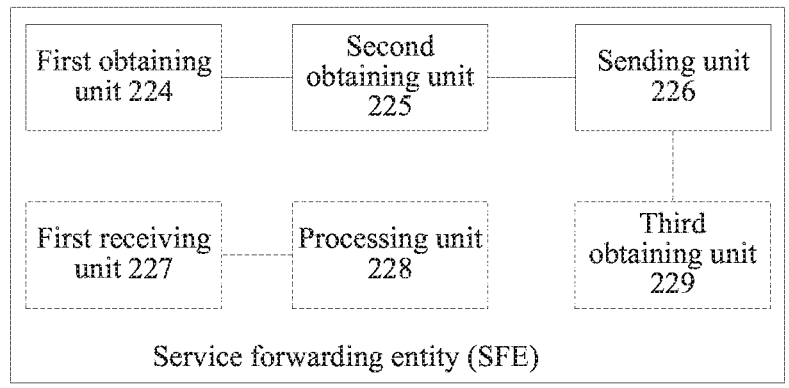
FIG. 6 is a schematic diagram of an SFE according to Embodiment 1.

FIG. 6 is a schematic diagram of an SFE according to Embodiment 1. The SFE shown in FIG. 6 includes: a first obtaining unit 224, a second obtaining unit 225, and a sending unit 226. Optionally, the SFE shown in FIG. 6 further includes a first receiving unit 227 and a processing unit 228. Optionally, the SFE shown in FIG. 6 further includes a third obtaining unit 229. Optionally, the SFE shown in FIG. 6 further includes a storage unit (not shown in FIG. 6), where the storage unit may be configured to store a first forwarding entry, a second forwarding entry, and a third forwarding entry.

The SFE shown in FIG. 6 and the SFE shown in FIG. 5 may be a same apparatus, for example, the SFE 22 or the SFE 25 shown in FIG. 2. It may be considered that FIG. 5 shows, from a physical perspective, content included in an SFE, and FIG. 6 shows, from a logical perspective, content included in an SFE. Optionally, the first receiving unit 227 and the sending unit 226 shown in FIG. 6 may be implemented by the communications interface 222 shown in FIG. 5; and the first obtaining unit 224, the second obtaining unit 225, the processing unit 228, and the third obtaining unit 229 shown in FIG. 6 may be implemented by the processor 220 shown in FIG. 5 according to the executable instruction stored in the memory 221. The storage unit included in the SFE shown in FIG. 6 may be implemented by the memory 221 shown in FIG. 5.

Figure 7:
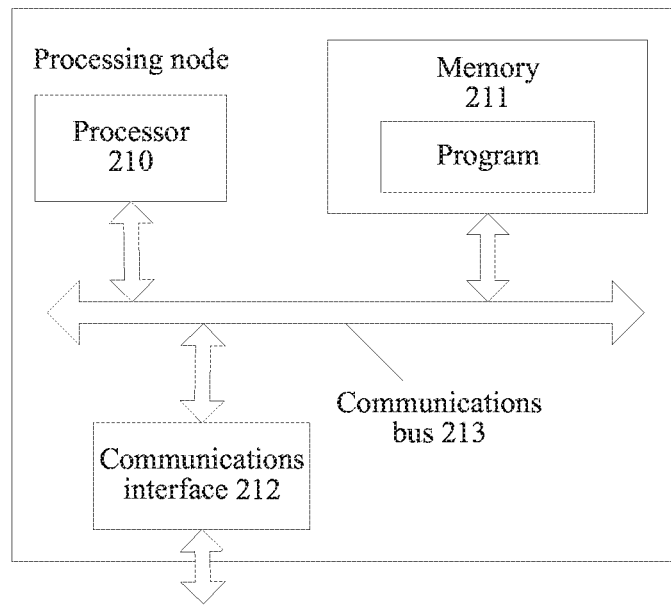
FIG. 7 is a schematic diagram of a processing node according to Embodiment 1.

FIG. 7 is a schematic diagram of a processing node according to Embodiment 1. The processing node provided in Embodiment 1 may be the service classifier 21 shown in FIG. 2, or may be the SFE 22 or the SFE 25 that is used as a control node and is shown in FIG. 2. The processing node shown in FIG. 7 may be a logical module or may be a physical device. The processing node shown in FIG. 7 may include: a processor 210, a memory 211, and a communications interface 212. The processor 210, the memory 211, and the communications interface 212 may be connected by using a communications bus 213. The processor 210 includes at least one physical processor, and the communications interface 212 includes at least one physical interface. The memory 211 is configured to store a program.

The processor 210 performs the following operations according to an executable instruction included in the program read from the memory 211.

The processor 210 obtains a flow identifier and indication information from the control node, where the flow identifier is used to identify a service flow to which a first packet belongs, and the first packet is a packet that is forwarded by a first SFC. A second packet and the first packet belong to the same service flow. The second packet reaches the processing node later than the first packet. For example, if the control node is the SFE 22 shown in FIG. 2 and the processing node is the service classifier 21 shown in FIG. 2, the service classifier 21 may obtain the flow identifier and the indication information from the SFE 22.

The processor 210 receives the second packet by using the communications interface 212. For example, if the processing node is the service classifier 21 shown in FIG. 2, the second packet may be the packet 3004 shown in FIG. 2; or if the processing node is the SFE 22 shown in FIG. 2, the second packet may be the packet 3104 shown in FIG. 2.

After determining that the second packet includes the flow identifier, the processor 210 processes the second packet according to a manner of processing the second packet. For example, if the manner of processing the second packet is an ID of a second SFC, the processing node is the service classifier 21 shown in FIG. 2, and the second packet is the packet 3004, the service classifier 21 adds an SFC header to the packet 3004, so as to obtain the packet 3104, where the SFC header of the packet 3104 includes the ID of the second SFC and an ID of the service classifier 21. If the manner of processing the second packet is an action instruction of discarding the second packet, the processing node is the service classifier 21 shown in FIG. 2, and the second packet is the packet 3004, the service classifier 21 discards a packet that carries the flow identifier, where the packet that carries the flow identifier includes the packet 3004.

Figure 8:
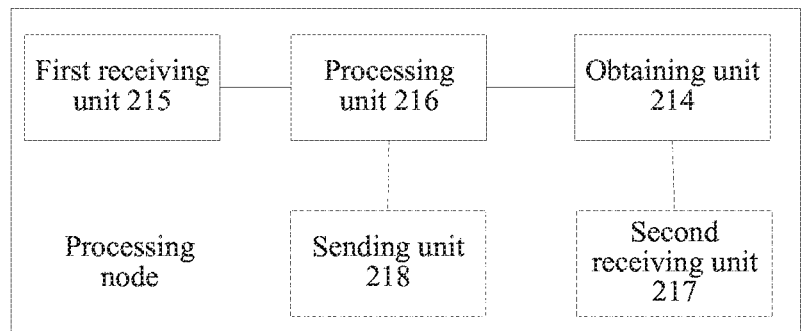
FIG. 8 is a schematic diagram of a processing node according to Embodiment 1.

FIG. 8 is a schematic diagram of a processing node according to Embodiment 1. The processing node shown in FIG. 8 may be the service classifier 21 shown in FIG. 2, or may be the SFE 22 or the SFE 25 shown in FIG. 2. The processing node shown in FIG. 8 includes: an obtaining unit 214, a first receiving unit 215, and a processing unit 216. Optionally, the processing node shown in FIG. 8 further includes a second receiving unit 217 and/or a sending unit 218. Optionally, the processing node shown in FIG. 8 further includes a storage unit (not shown in FIG. 8), where the storage unit may be configured to store a flow table entry. The flow table entry includes a flow identifier and a manner of processing a second packet, and the manner of processing the second packet may be an ID of a second SFC or an action instruction.

The processing node shown in FIG. 8 and the processing node shown in FIG. 7 may be a same apparatus, for example, the processing node may be the service classifier 21 shown in FIG. 2. Alternatively, the processing node is a control node. That is, the SFE 22 or the SFE 25 shown in FIG. 2 not only may be a control node, but also may be a processing node. It may be considered that FIG. 7 shows, from a physical perspective, content included in a processing node, and FIG. 8 shows, from a logical perspective, content included in a processing node. Optionally, the first receiving unit 215, the second receiving unit 217, and the sending unit 218 shown in FIG. 8 may be implemented by the communications interface 212 shown in FIG. 7; and the obtaining unit 214 and the processing unit 216 shown in FIG. 8 may be implemented by the processor 210 shown in FIG. 7 according to the executable instruction stored in the memory 211. The storage unit included in the processing node shown in FIG. 8 may be implemented by the memory 211 shown in FIG. 7.

Figure 9:
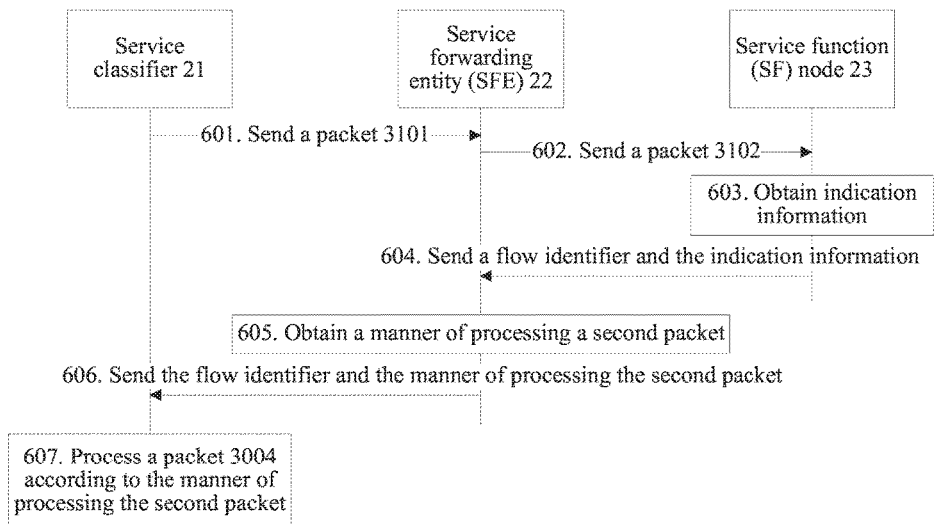
FIG. 9 is a schematic diagram of a method for updating a manner of processing a packet of a service flow according to Embodiment 1.

FIG. 9 is a schematic diagram of a method for updating a manner of processing a packet of a service flow according to Embodiment 1. In Embodiment 1, a control node is an SFE 22. If an SF node that obtains indication information is an SF node 23, a first packet is a packet 3102. If a processing node is a service classifier 21, a second packet is a packet 3004; or if a processing node is an SFE 22, a second packet is a packet 3104. The method for updating a manner of processing a packet of a service flow provided in Embodiment 1 is described in detail in the following with reference to FIG. 2 to FIG. 8.

601. A service classifier 21 sends a packet 3101 to an SFE 22.

For example, a second receiving unit 217 of the service classifier 21 may receive a packet 3001, where the packet 3001 includes a flow identifier. The flow identifier may be carried in a packet header and/or a payload (payload) of the packet 3001, and the payload may also be referred to as packet content. The flow identifier may include at least one of an Ethernet destination address, an Ethernet source address, a source IP address, a destination IP address, a source UDP port, a destination UDP port, a source TCP port, a destination TCP port, a protocol number, an ID of a VLAN, an MPLS label, or an IPv6 flow label. For example, if the packet 3001 is an Ethernet packet, the flow identifier may include an Ethernet destination address, an Ethernet source address, and an Ethernet protocol type. If the packet 3001 is an IP packet, the flow identifier may include at least one of a source IP address, a destination IP address, a source UDP port, a destination UDP port, a source TCP port, a destination TCP port, an ID of a VLAN, or an MPLS label.

For example, a storage unit of the service classifier 21 stores a flow table entry, where the flow table entry includes the flow identifier and an ID of a first SFC, and the ID of the first SFC may be indicated by using a path ID. A processing unit 216 may obtain the ID of the first SFC from the storage unit according to the flow identifier included in the packet 3001. The processing unit 216 may add an SFC header to the packet 3001, so as to obtain the packet 3101, where an SFC header of the packet 3101 includes the ID of the first SFC. The SFC header of the packet 3101 may further include an ID of the service classifier 21. A sending unit 218 sends the packet 3101 to the SFE 22.

Figure 10:
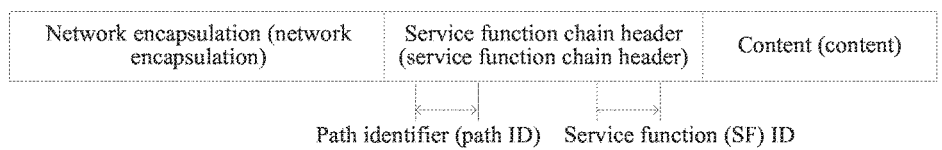
FIG. 10 is a schematic diagram of a packet that includes an SFC header according to an embodiment.

For example, the packet 3101 shown in FIG. 2 may be in a format of a packet shown in FIG. 10. The packet shown in FIG. 10 includes network encapsulation (network encapsulation), an SFC header, and content (content). The network encapsulation may be Ethernet encapsulation, UDP encapsulation, Generic Routing Encapsulation (GRE), MPLS encapsulation, or the like. The SFC header may be used to instruct an SFE to forward the packet along an SFC identified by a path ID. One or more bits included in the SFC header may be used to carry the path ID, for example, the path ID may be the ID of the first SFC or an ID of a second SFC. One or more bits included in the SFC header may be used to carry an ID of an SF node, where the ID of the SF node may be used to identify a previous SF node, through which the packet to which the SFC header has been added passes before the packet reaches the SFE, in the SFC. For example, if the packet shown in FIG. 10 is the packet 3101, the ID of the SF node included in the SFC header of the packet 3101 may be set to a preset value, where the preset value may be the ID of the service classifier 21, and the preset value may indicate that before reaching the SFE 22, the packet 3101 has not passed through any SF node in the first SFC.

602. The SFE 22 sends a packet 3102 to an SF node 23.

For example, a first receiving unit 227 of the SFE 22 receives the packet 3101 sent by the service classifier 21. A processing unit 228 may determine a first forwarding entry according to the ID of the service classifier 21 and the ID of the first SFC that are included in the SFC header of the packet 3101, where a next hop of the first forwarding entry includes an ID of the SF node 23. If the SFE 22 updates the ID of the SF node in the SFC header of the packet 3101, the processing unit 228 may obtain the packet 3102 according to the packet 3101 and the ID of the SF node 23. A sending unit 226 sends the packet 3102 to the SF node 23 according to the first forwarding entry.

For example, the processing unit 228 may generate the packet 3102 according to the packet 3101 and the ID of the SF node 23. The packet 3102 may be in the format of the packet shown in FIG. 10. A path ID in an SFC header of the packet 3102 is the ID of the first SFC, and an ID of an SF node in the SFC header of the packet 3102 is the ID of the SF node 23. Alternatively, the processing unit 228 may replace the preset value in the SFC header of the packet 3101 with the ID of the SF node 23, so as to obtain the packet 3102.

603. The SF node 23 obtains a flow identifier and indication information.

For example, a receiving unit 234 included in the SF node 23 receives the packet 3102 sent by the SFE 22. A processing unit 235 processes the packet 3102, so as to obtain the indication information. The processing unit 235 may process the packet 3102 according to the flow identifier and/or application-layer information that is included in the packet 3102, so as to obtain the indication information.

For example, if a firewall function is configured for the SF node 23, the processing unit 235 may determine, according to the flow identifier included in the packet 3102, whether the packet 3001 corresponding to the packet 3102 is from a trusted user. If the processing unit 235 determines that the packet 3001 corresponding to the packet 3102 is from a trusted user, the indication information obtained by the processing unit 235 is a first action instruction, where the first action instruction is to skip processing performed by the SF node 23. If the processing unit 235 determines that the packet 3001 corresponding to the packet 3102 is from an untrusted user, the indication information obtained by the processing unit 235 is a second action instruction, where the second action instruction is to discard a second packet.

For example, if a DPI function is configured for the SF node 23, the processing unit 235 determines, according to the flow identifier included in the packet 3102 and/or application-layer information obtained by parsing the packet 3102, that a service type corresponding to a service flow to which the packet 3102 belongs is video. The indication information obtained by the processing unit 235 is video.

604. The SF node 23 sends the flow identifier and the indication information to the SFE 22.

For example, a sending unit 236 of the SF node 23 sends the flow identifier and the indication information to the SFE 22. If the SFE 22 is a processing node, the second packet is the packet 3104 shown in FIG. 2; or if the service classifier 21 is a processing node, the second packet is the packet 3004 shown in FIG. 2.

Figure 11:
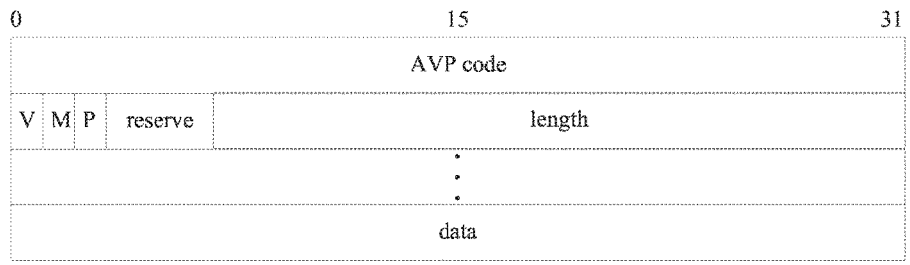
FIG. 11 is a schematic diagram of an AVP included in a Diameter protocol packet according to an embodiment.

Optionally, a first obtaining unit 237 included in the SF node 23 may obtain a packet 3201 according to the flow identifier and the indication information, where the packet 3201 may be a Diameter protocol packet. A Diameter header of the Diameter protocol packet may carry the flow identifier and the indication information, for example, an AVP included in the Diameter header may carry the flow identifier and the indication information, as shown in FIG. 11. The sending unit 236 sends the Diameter protocol packet to the SFE 22.

For example, the Diameter header of the Diameter protocol packet is extended, and whether the Diameter protocol packet carries the indication information is identified by using a command flag (Command Flags) field in the Diameter header. The AVP in the Diameter header shown in FIG. 11 includes an AVP header and a data (data) field. An attribute value pair code (AVP code) field in the AVP header may carry an ID of a parameter. The parameter may be a parameter such as a source IP address or a destination IP address included in the flow identifier. A V field in the AVP header may be used to identify whether a field that carries a manufacturer identifier exists. An M field in the AVP header may be used to identify a processing manner when a device that receives the Diameter protocol packet cannot identify the AVP, for example, that M is 1 indicates that a receiving party needs to reply with an error code, and that M is 0 indicates that the receiving party may ignore the AVP. P in the AVP header and reserved in the AVP header are reserved bytes. A length (length) field in the AVP header may carry a length value of the AVP header. Content of the data field of the AVP header may be content of the parameter carried in the AVP code field. A correspondence between an AVP code and a flow identifier may be shown in Table 1.

TABLE 1

| Name | AVP code | Data type |
| --- | --- | --- |
| SF_ID | 500 | unsigned32 |
| IPV4_SRC | 501 | address |
| TCP_SRC | 502 | unsigned32 |
| IPV4_DST | 503 | address |
| TCP_DST | 504 | unsigned32 |
| result | 505 | unsigned32 |
| feedback | 9999 | grouped |

In Table 1, SF_ID is an ID of an SF node that generates indication information, IPV4_SRC indicates an Internet Protocol version 4 (IPV4) source address, TCP_SRC indicates a TCP source port, IPV4_DST indicates an IPV4 destination address, TCP_DST indicates a TCP destination port, result indicates indication information, and a data type of feedback is grouped. Address in data types is used to identify that a data type corresponding to an AVP code is address. Unsigned32 in data types may be used to identify that a data type corresponding to an AVP code is undefined 32-bit data. If an AVP code field carries feedback, the Diameter protocol packet carries the indication information. Alternatively, if a numerical value of an AVP code included in the Diameter protocol packet is 505, the Diameter protocol packet carries the indication information. If an AVP code field carries feedback, a data field may carry multiple AVPs, and each AVP may be in a format shown in FIG. 11.

That the packet 3201 is the Diameter protocol packet is used as an example, and if a numerical value of an AVP code field in an AVP header is 9999, a data field may carry multiple AVPs. The multiple AVPs carried in the data field are not arranged in a particular sequence, and for ease of description, the multiple AVPs carried in the data field are expressed as a first AVP, a second AVP, a third AVP, a fourth AVP, and a fifth AVP. If a numerical value of an AVP code field in an AVP header of the first AVP is 501, a data field of the first AVP may include an IPV4 source address of the packet 3001. If a numerical value of an AVP code field in an AVP header of the second AVP is 502, a data field of the second AVP includes a TCP source port of the packet 3001. If a numerical value of an AVP code field in an AVP header of the third AVP is 503, a data field of the third AVP includes an IPV4 destination port of the packet 3001. If a numerical value of an AVP code field in an AVP header of the fourth AVP is 504, a data field of the fourth AVP includes a TCP destination port of the packet 3001. If a numerical value of an AVP code field in an AVP header of the fifth AVP is 505, a data field of the fifth AVP includes indication information. Optionally, the multiple AVPs carried in the data field of the packet 3201 further include a sixth AVP. If a numerical value of an AVP code field in an AVP header of the sixth AVP is 500, a data field of the sixth AVP may include the ID of the SF node 23.

Optionally, a second obtaining unit 238 may add the indication information to the SFC header of the packet 3102, so as to obtain a packet 3103. The packet 3103 may be in the format of the packet shown in FIG. 10. A path ID included in an SFC of the packet 3103 is the ID of the first SFC, an ID of an SF node in the SFC header of the packet 3103 is the ID of the SF node 23, and the ID of the SF node in the SFC header of the packet 3103 indicates that a previous SF node, through which the packet 3103 has passed before the packet 3103 reaches the SFE 22, in the first SFC is the SF node 23. The SFC header of the packet 3103 may be in a format shown in FIG. 12. The sending unit 236 sends the packet 3103 to the SFE 22.

Figure 12:
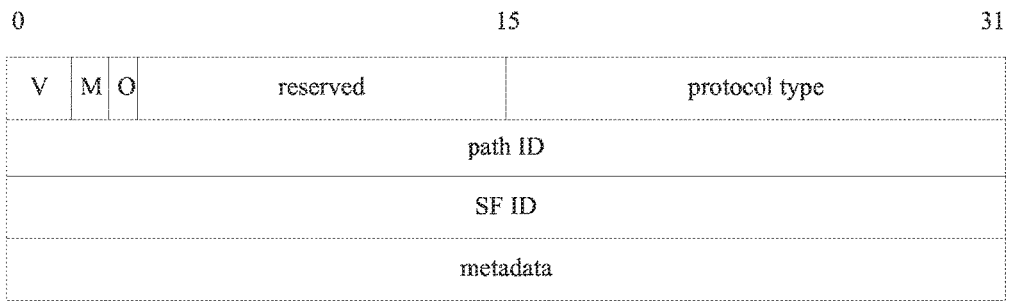
FIG. 12 is a schematic diagram of an SFC header according to an embodiment.

For example, a V field in an SFC header shown in FIG. 12 may be used to identify a version of the SFC header. An M field in the SFC header may be used to identify whether indication information is carried. An O field in the SFC header is used to identify whether operation, administration and maintenance (OAM) information is carried. A protocol type field in the SFC header is used to identify a protocol type of network encapsulation. A path ID in the SFC header may be the path ID shown in FIG. 10, for example, the ID of the first SFC or the ID of the second SFC. An ID of an SF node in the SFC header may be the ID of the SF node shown in FIG. 10. Metadata in the SFC header may carry the indication information.

Figure 13:
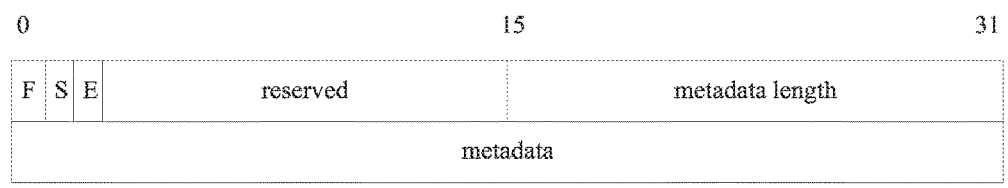
FIG. 13 is a schematic diagram of metadata in an SFC header according to an embodiment.

For example, the SFC header shown in FIG. 12 may be in a format shown in FIG. 13. In FIG. 13, an F field indicates that information carried in metadata is forwarding-type information, and the forwarding-type information may be used by the SFE 22 to forward a policy. An S field indicates that the information carried in the metadata is service-type information, and the service-type information may be used by another SF node in an SFC to perform service processing. An E field indicates that the information carried in the metadata is feedback-type information, and the feedback-type information may include the indication information. A reserved field is a reserved bit. A metadata length (metadata length) field may be used to identify a length of the metadata in the SFC header shown in FIG. 12. The metadata shown in FIG. 13 may carry one or more of the forwarding-type information, the service-type information, or the feedback-type information.

605. The SFE 22 obtains a manner of processing a second packet.

For example, a first obtaining unit 224 included in the SFE 22 obtains the flow identifier and the indication information from the SF node 23. A second obtaining unit 225 obtains, according to the indication information, the manner of processing the second packet.

For example, if the indication information corresponds to the service type of the service flow, the second obtaining unit 225 obtains the ID of the second SFC according to the indication information. If a service function of the SF node 23 is DPI and the SF node 23 learns that the service type of the service flow is video, the second obtaining unit 225 may obtain the ID of the second SFC according to video and a preset optimization policy. The preset optimization policy may be to add an SF node having a transcoding function into a service path in which a video is forwarded. An SF node 24 included in the second SFC has a transcoding function. The SF node 24 may convert, into 2 M data, 4 M data of the service flow to which the packet 3001 belongs. The SF node 24 included in the second SFC helps save bandwidth and improve video smoothness. Optionally, the SFE 22 may save a service type and an ID of an SFC that corresponds to the service type. The second obtaining unit 225 may determine, according to the service type of the service flow, an ID of an SFC used to forward the service flow.

For example, if the indication information corresponds to whether a user is trusted, the second obtaining unit 225 obtains an action instruction according to the indication information, where the action instruction may be to discard the second packet or skip the SF node 23. If a service function of the SF node 23 is a firewall function and the SF node 23 determines that the packet 3001 is from a trusted user, the second obtaining unit 225 obtains, according to information that the packet 3001 is from a trusted user, an action instruction of skipping the SF node 23. If the SF node 23 determines that the packet 3001 is from an untrusted user, the second obtaining unit 225 obtains, according to information that the packet 3001 is from an untrusted user, an action instruction of discarding the second packet.

606. The SFE 22 sends the flow identifier and the manner of processing the second packet to the service classifier 21.

For example, a sending unit 226 included in the SFE 22 is configured to send, to the service classifier 21, the flow identifier and the manner of processing the second packet.

Optionally, a third obtaining unit 229 of the SFE 22 may obtain a packet 3202 according to the flow identifier and the manner of processing the second packet. The sending unit 226 sends the packet 3202 to the service classifier 21.

For example, the packet 3202 may be an OF protocol packet, where a payload of the OF protocol packet may include the flow identifier and the manner of processing the second packet.

607. The service classifier 21 processes a packet 3004 according to the manner of processing the second packet.

For example, an obtaining unit 214 included in the service classifier 21 obtains, from the SFE 22, the flow identifier and the manner of processing the second packet. The obtaining unit 214 may update, by using the flow identifier and the manner of processing the second packet that are obtained, a flow table entry that has been already stored in the service classifier 21. The obtaining unit 214 may obtain the updated flow table entry, where the updated flow table entry includes the flow identifier and the manner of processing the second packet. If the service classifier 21 is a processing node, the packet 3004 is the second packet. A first receiving unit 215 receives the packet 3004 included in the service flow. The processing unit 216 may process the packet 3004 according to the updated flow table entry corresponding to the flow identifier.

For example, the second receiving unit 217 included in the service classifier 21 may receive the packet 3202 sent by the SFE 22. The obtaining unit 214 may obtain, from the packet 3202, the flow identifier and the manner of processing the second packet. If the manner of processing the second packet is the ID of the second SFC, the processing unit 216 may add, to the packet 3004, an SFC header that carries the ID of the second SFC, so as to obtain the packet 3104. Optionally, the processing unit 216 may add the ID of the service classifier 21 to the SFC header of the packet 3104. The packet 3104 may be of a structure shown in FIG. 10. An SFC header included in the packet 3104 may be of structures shown in FIG. 12 and FIG. 13. The sending unit 218 may learn that the SF node 24 in the second SFC is connected to the SFE 22. The sending unit 218 sends the packet 3104 to the SFE 22. If the manner of processing the second packet is to discard the second packet, the processing unit 216 may discard the packet 3004 and a subsequently received packet of the service flow.

If the SFE 22 receives the packet 3104 from the service classifier 21, the processing unit 228 of the SFE 22 may determine a second forwarding entry according to the ID of the service classifier 21 and the ID of the second SFC that are included in the SFC header of the packet 3104, where a next hop in the second forwarding entry includes an ID of the SF node 24. If the SFE 22 updates the ID of the SF node in the SFC header of the packet 3104, the processing unit 228 of the SFE 22 may obtain a packet 3105 according to the ID of the SF node 24 and the packet 3104. The sending unit 226 of the SFE 22 sends the packet 3105 to the SF node 24. A receiving unit 234 of the SF node 24 may receive the packet 3105 from the SFE 22. A processing unit 235 of the SF node 24 may process the packet 3105, so as to obtain a packet 3106. A sending unit 236 of the SF node 24 sends the packet 3106 to the SFE 22. The packet 3106 may be of the structures shown in FIG. 10, FIG. 12, and FIG. 13. An ID of an SF node in an SFC header of the packet 3106 indicates the SF node 24, through which the packet 3106 has passed before the packet 3106 reaches the SFE 22, in the second SFC. The first receiving unit 227 of the SFE 22 receives the packet 3106. The processing unit 228 of the SFE 22 may determine a third forwarding entry according to the ID of the SF node 24 and the ID of the second SFC, where a next hop in the third forwarding entry is an ID of an SFE 25. The sending unit 226 of the SFE 22 sends the packet 3106 to the SFE 25 according to the third forwarding entry. A first receiving unit 227 of the SFE 25 may receive the packet 3106 sent by the SFE 22. A processing unit 228 of the SFE 25 may determine a forwarding entry according to the ID of the second SFC and the ID of the SF node 24 that are included in the packet 3106, where a next hop of the forwarding entry is an ID of an SF node 26. If the SFE 25 may update the ID of the SF node in the SFC header of the packet 3106, the processing unit 228 of the SFE 25 may obtain a packet 3107 according to the ID of the SF node 26 and the packet 3106. An ID of an SF node in an SFC header of the packet 3107 is the ID of the SF node 26. A sending unit of the SFE 25 sends the packet 3107 to the SF node 26. A method for the SFE 25 to obtain the packet 3107 is the same as a method for the SFE 22 to obtain the packet 3105, and details are not described herein. In this way, the packet 3004 and a subsequent packet of the service flow may both be processed and forwarded along a path corresponding to the second SFC.

In Embodiment 1, an example in which the SF node 23 sends indication information to the SFE 22 is used for description. Another SF node in the SFC may also send the indication information to a control node, and examples are not described one by one herein.

In the method provided in Embodiment 1, the SFE 22 may obtain, according to the flow identifier and the indication information that are sent by the SF node 23, the manner of processing the second packet. The SFE 22 may send the flow identifier and the manner of processing the second packet to the service classifier 21 by using the extended packet 3202. The service classifier 21 processes the service flow according to information carried in the packet 3202, which helps adjust, according to a result of processing the service flow by the SF node, a manner of processing the service flow.

Optionally, if the manner of processing the second packet is to discard the second packet or to skip the SF node 23, the SFE 22 may be used as the processing node. If the SFE 22 is the processing node, the SFE 22 may not perform step 606 or the subsequent step, and the second packet is the packet 3104 sent by the service classifier 21 to the SFE 22. If the SFE 22 is the processing node, the SFC header of the packet 3104 received by the SFE 22 includes the ID of the first SFC and a preset value. The second obtaining unit 225 included in the SFE 22 may be an obtaining unit 214 included in the processing node. The first receiving unit 215 included in the SFE 22 may be a first receiving unit 215 included in the processing node. The processing unit 228 included in the SFE 22 may be a processing unit 216 included in the processing node. The sending unit 226 included in the SFE 22 may be a sending unit 218 included in the processing node. If the manner that is obtained by the second obtaining unit 225 included in the SFE 22 and that is used to process the packet 3104 is to discard the second packet, the processing unit 228 included in the SFE 22 discards the packet 3104. If the manner that is obtained by the second obtaining unit 225 included in the SFE 22 and that is used to process the packet 3104 is to skip the SF node 23, the processing unit 228 included in the SFE 22 may determine the ID of the SFE 25 according to the flow identifier included in the packet 3104. The SF node 26 connected to the SFE 25 is a next-hop SF node of the SF node 23 in the first SFC. The sending unit 226 included in the SFE 22 sends the packet 3104 to the SFE 25 according to the ID of the SFE 25. The SFE 22 may generate a correspondence between the flow identifier and the ID of the SFE 25 according to a manner of processing the packet 3104, that is, skipping the SF node 23. In this way, the service flow to which the packet 3004 belongs is not processed by the SF node 23 in the first SFC.

Embodiment 2

Figure 14:
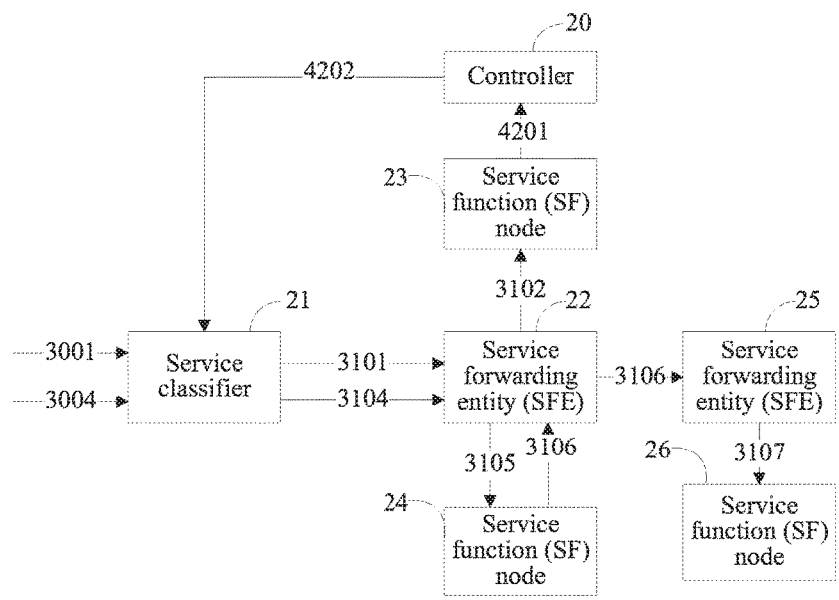
FIG. 14 is a schematic diagram of a network scenario according to Embodiment 2.

FIG. 14 is a schematic diagram of a network scenario according to Embodiment 2. A network shown in FIG. 14 includes a first SFC and a second SFC. SF nodes included in the first SFC are not completely the same as SF nodes included in the second SFC. As shown in FIG. 14, the first SFC includes an SF node 23 and an SF node 26, and the second SFC includes an SF node 24 and the SF node 26. In the network shown in FIG. 14, a controller 20 is connected to both a service classifier 21 and the SF node 23, the service classifier 21 is connected to an SFE 22, the SFE 22 is further connected to the SF node 23, the SF node 24, and an SFE 25, and the SFE 25 is connected to the SF node 26. In the network shown in FIG. 14, a packet 3001 and a packet 3004 belong to a same service flow, and the packet 3004 reaches the service classifier 21 later than the packet 3001. The service classifier 21 first sends a packet 3101 to the SFE 22, and then sends a packet 3104 to the SFE 22.

The SF node provided in Embodiment 2 may be of a physical structure of the SF node shown in FIG. 3, and details are not described herein.

Figure 15:
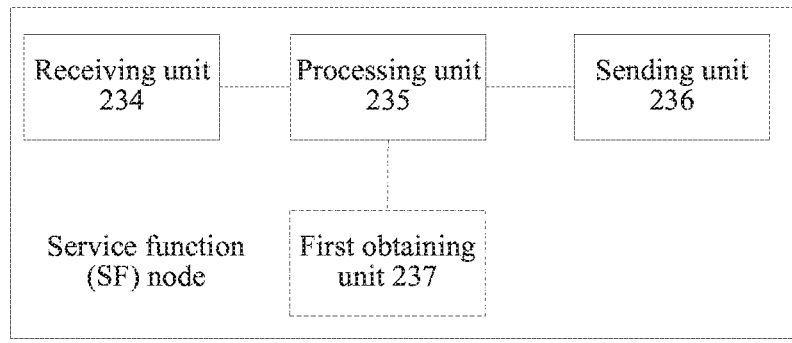
FIG. 15 is a schematic diagram of an SF node according to Embodiment 2.

FIG. 15 is a schematic diagram of an SF node according to Embodiment 2. The SF node shown in FIG. 15 may be the SF node 23, the SF node 24, or the SF node 26 shown in FIG. 14. The SF node shown in FIG. 15 includes: a receiving unit 234, a processing unit 235, and a sending unit 236. Optionally, the SF node shown in FIG. 15 further includes a first obtaining unit 237. It may be considered that FIG. 3 shows, from a physical perspective, content included in an SF node, and FIG. 15 shows, from a logical perspective, content included in an SF node. Optionally, the receiving unit 234 and the sending unit 236 shown in FIG. 15 may be implemented by the communications interface 232 shown in FIG. 3, and the processing unit 235 and the first obtaining unit 237 shown in FIG. 15 may be implemented by the processor 230 shown in FIG. 3 according to the executable instruction stored in the memory 231.

Figure 16:
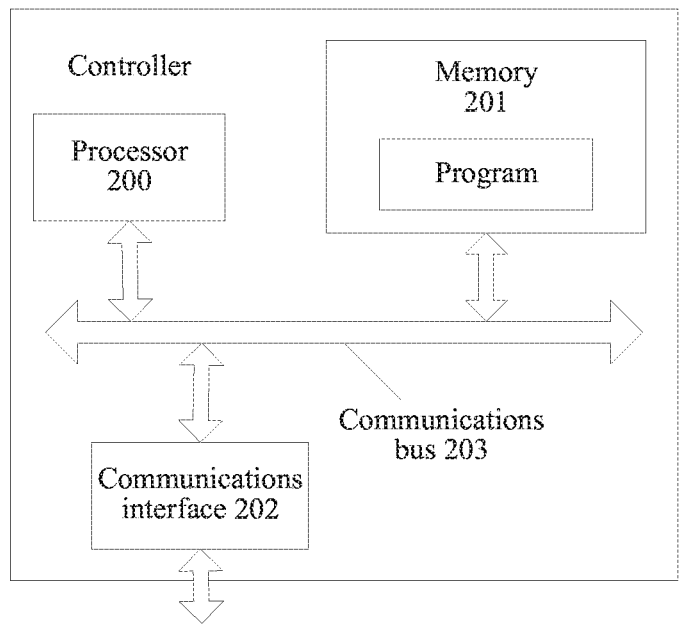
FIG. 16 is a schematic diagram of a controller according to Embodiment 2.

FIG. 16 is a schematic diagram of a controller according to Embodiment 2. The controller shown in FIG. 16 may be the controller 20 in the network shown in FIG. 14. The controller shown in FIG. 16 may be a logical module. Alternatively, the controller shown in FIG. 16 may be a physical device. The controller shown in FIG. 16 may be a control node.

The controller shown in FIG. 16 may include: a processor 200, a memory 201, and a communications interface 202. The processor 200, the memory 201, and the communications interface 202 are connected by using a communications bus 203. The processor 200 includes at least one physical processor, and the communications interface 202 includes at least one physical interface.

The memory 201 is configured to store a program. Optionally, the memory 201 may be further configured to store a correspondence, where the correspondence includes indication information and a manner of processing a second packet, and the manner of processing the second packet may be an ID of a second SFC or an action instruction. The action instruction may be to discard the second packet or skip a preset SF node, where the preset SF node may be an SF node that obtains the indication information.

The processor 200 performs the following operations according to an executable instruction included in the program read from the memory 201.

The processor 200 obtains a flow identifier and indication information from an SF node of the first SFC by using the communications interface 202. The first SFC is used to forward a first packet, for example, a path corresponding to the first SFC shown in FIG. 14 is used to forward the packet 3101, the flow identifier is used to identify a service flow to which a first packet belongs, and a second packet and the first packet belong to the same service flow. The second packet reaches a processing node later than the first packet. For example, if the processing node is the service classifier 21, the second packet may be the packet 3004 shown in FIG. 14; or if the processing node is the SFE 22, the second packet may be the packet 3104 shown in FIG. 14.

The processor 200 obtains, according to the indication information, a manner of processing the second packet, where the manner of processing the second packet may be an ID of a second SFC or an action instruction. The second SFC is used to forward the second packet, for example, a path corresponding to the second SFC shown in FIG. 14. The processor 200 may send the flow identifier and the manner of processing the second packet to the processing node. The processing node may be the service classifier 21 shown in FIG. 14; or the processing node is an SFE connected to the SF node that sends the indication information, for example, the SFE 22 shown in FIG. 14.

Figure 17:
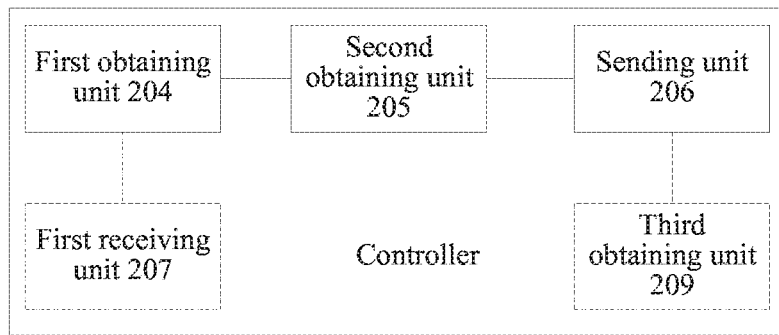
FIG. 17 is a schematic diagram of a controller according to Embodiment 2.

FIG. 17 is a schematic diagram of a controller according to Embodiment 2. The controller shown in FIG. 17 includes: a first obtaining unit 204, a second obtaining unit 205, and a sending unit 206. Optionally, the controller shown in FIG. 17 further includes a first receiving unit 207. Optionally, the controller shown in FIG. 17 further includes a third obtaining unit 209. Optionally, the controller shown in FIG. 17 further includes a storage unit (not shown in FIG. 17), where the storage unit may be configured to store a correspondence.

The controller shown in FIG. 17 and the controller shown in FIG. 16 may be a same apparatus, for example, both are the controller 20 shown in FIG. 14. It may be considered that FIG. 16 shows, from a physical perspective, content included in a controller, and FIG. 17 shows, from a logical perspective, content included in a controller. Optionally, the first receiving unit 207 and the sending unit 206 shown in FIG. 17 may be implemented by the communications interface 202 shown in FIG. 16; and the first obtaining unit 204, the second obtaining unit 205, and the third obtaining unit 209 shown in FIG. 17 may be implemented by the processor 200 shown in FIG. 16 according to the executable instruction stored in the memory 201. The storage unit included in the controller shown in FIG. 17 may be implemented by the memory 201 shown in FIG. 16.

Figure 18:
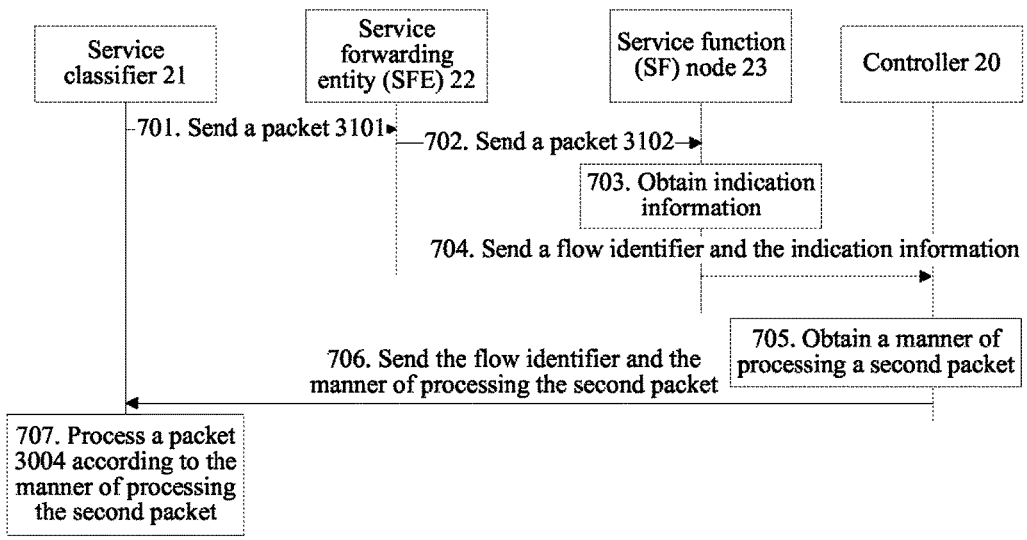
FIG. 18 is a schematic diagram of a method for updating a manner of processing a packet of a service flow according to Embodiment 2.

FIG. 18 is a schematic diagram of a method for updating a manner of processing a packet of a service flow according to Embodiment 2. In Embodiment 2, a control node is a controller 20. If an SF node that obtains indication information is an SF node 23, a first packet is a packet 3102. In Embodiment 2, an example in which the SF node 23 sends the indication information to the controller 20 is used for description. An SF node 24 and/or an SF node 26 may send the indication information to the controller 20 by using a method used by the SF node 23, and examples are not described one by one herein. The method for updating a manner of processing a packet of a service flow provided in Embodiment 2 is described in detail in the following with reference to FIG. 3 and FIG. 14 to FIG. 17.

701. A service classifier 21 sends a packet 3101 to an SFE 22.

Content included in step 701 in Embodiment 2 is the same as the content included in step 601 in Embodiment 1, and details are not described herein.

702. The SFE 22 sends a packet 3102 to an SF node 23.

Content included in step 702 in Embodiment 2 is the same as the content included in step 602 in Embodiment 1, and details are not described herein.

703. The SF node 23 obtains indication information.

Content included in step 703 in Embodiment 2 is the same as the content included in step 603 in Embodiment 1, and details are not described herein.

704. The SFE 23 sends a flow identifier and the indication information to a controller 20.

For example, a sending unit 236 included in the SF node 23 sends the flow identifier and the indication information to the controller 20.

Optionally, a first obtaining unit 238 included in the SF node 23 may generate a packet 4201 according to the flow identifier carried in the packet 3101 and the indication information obtained by a processing unit 235. The packet 4201 may be a Diameter protocol packet or a Remote Authentication Dial In User Service (Radius) protocol packet. If the packet 4201 is a Diameter protocol packet, a format of an AVP in a Diameter header of the packet 4201 may be the format shown in FIG. 11. In other words, the packet 4201 may be in a format that is the same as that of the packet 3201 in Embodiment 1. The sending unit 236 may send the packet 4201 to the controller.

Optionally, the controller 20 may further obtain an ID of the SF node 23 from the SF node 23. The controller 20 may determine, according to the ID of the SF node 23, whether the indication information is from a trusted SF node.

705. The controller 20 obtains a manner of processing a second packet.

For example, a first obtaining unit 204 included in the controller 20 obtains the flow identifier and the indication information from the packet 4201 sent by the SF node 23. A second obtaining unit 205 obtains, according to the indication information, the manner of processing the second packet. The second obtaining unit 205 may obtain, according to the manner of the second obtaining unit 225 in step 605, the manner of processing the second packet, and details are not described herein.

706. The controller 20 sends the flow identifier and the manner of processing the second packet to the service classifier 21.

For example, a sending unit 206 of the controller 20 sends the manner of processing the second packet to the service classifier 21.

Optionally, a third obtaining unit 209 may obtain a packet 4202 according to the flow identifier and the manner of processing the second packet. The packet 4202 may be an OF protocol packet, a Network Configuration Protocol (NETCONF) packet, or an Interface to routing system (I2RS) protocol packet. If the packet 4202 is an OF protocol packet, the packet 4202 may be in a format that is the same as that of the packet 3202 in Embodiment 1, and details are not described herein. The sending unit 206 sends the packet 4202 to the service classifier 21.

707. The service classifier 21 processes a packet 3004 according to the manner of processing the second packet.

For example, an obtaining unit 214 of the service classifier 21 obtains, from the controller 20, the flow identifier and the manner of processing the second packet. The obtaining unit 214 may obtain an updated flow table entry, where the updated flow table entry includes the flow identifier and the manner of processing the second packet. A first receiving unit 215 receives the packet 3004 included in the service flow. A processing unit 216 may process the packet 3004 according to the updated flow table entry corresponding to the flow identifier.

For example, a second receiving unit 217 included in the service classifier 21 may receive the packet 4202 sent by the controller 20. The obtaining unit 214 may obtain, from the packet 4202, the flow identifier and the manner of processing the second packet. A method for the service classifier 21 to process the packet 3004 in Embodiment 2 is the same as the content included in step 607 in Embodiment 1, and details are not described herein. A method for the SFE 22 to process a packet 3104 in Embodiment 2 is the same as the content included in step 607 in Embodiment 1, and details are not described herein.

In the method provided in Embodiment 2, an example in which the SF node 23 sends indication information to the controller 20 is used for description.

In the method provided in Embodiment 2, the controller 20 may obtain, according to the flow identifier and the indication information that are sent by the SF node 23, the manner of processing the second packet. The controller 20 may send the flow identifier and the manner of processing the second packet to the service classifier 21 by using the extended packet 4202. The service classifier 21 processes the service flow according to information carried in the packet 4202, which helps adjust, according to a result of processing the service flow by the SF node, a manner of processing the service flow.

Optionally, if the processing node is the SFE 22, after step 705, the method provided in Embodiment 2 further includes: sending, by the controller 20, the flow identifier and the manner of processing the second packet to the SFE 22 by using an OF protocol packet. A format of the OF protocol packet sent by the controller 20 to the SFE 22 may be the same as the format of the packet 3202 in Embodiment 1, and details are not described herein. The SFE 22 used as the processing node may process a packet 3104 and a packet 3105 according to the method in Embodiment 1, and details are not described herein.

Embodiment 3

Figure 19:
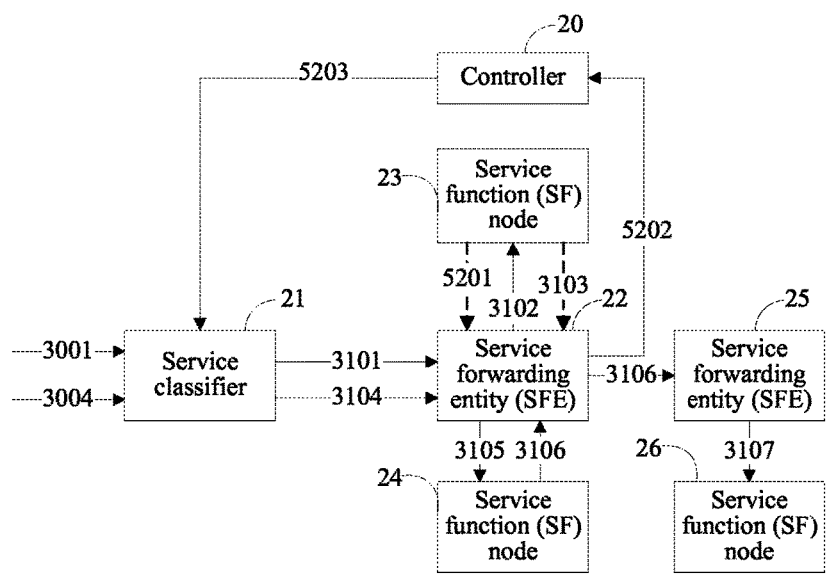
FIG. 19 is a schematic diagram of a network scenario according to Embodiment 3.

FIG. 19 is a schematic diagram of a network scenario according to Embodiment 3. A network shown in FIG. 19 includes a first SFC and a second SFC. SF nodes included in the first SFC are not completely the same as SF nodes included in the second SFC. For example, the first SFC includes an SF node 23 and an SF node 26, and the second SFC includes an SF node 24 and the SF node 26. In the network shown in FIG. 19, a controller 20 is connected to both a service classifier 21 and an SFE 22. Optionally, the controller 20 may be further connected to an SFE 25. The service classifier 21 is connected to the SFE 22, the SFE 22 is further connected to the SF node 23, the SF node 24, and the SFE 25, and the SFE 25 is connected to the SF node 26. In the network shown in FIG. 19, a packet 3001 and a packet 3004 belong to a same service flow, and the packet 3004 reaches the service classifier 21 later than the packet 3001. The service classifier 21 first sends a packet 3101 to the SFE 22, and then sends a packet 3104 to the SFE 22.

Content included in an SF node in Embodiment 3 may be the same as that of the SF node in Embodiment 1, in other words, the SF node in Embodiment 3 may include the content included in the SF node shown in FIG. 3 or FIG. 4, and details are not described herein.

Content included in the SFE in Embodiment 3 from a physical perspective may be the same as the content included in the SFE shown in FIG. 5, and details are not described herein.

Figure 20:
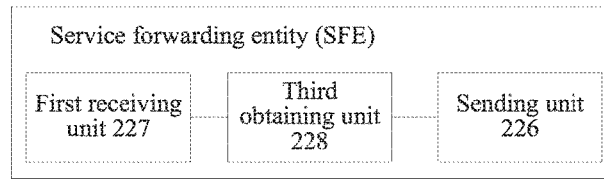
FIG. 20 is a schematic diagram of an SFE according to Embodiment 3.

FIG. 20 is a schematic diagram of an SFE according to Embodiment 3. The SFE shown in FIG. 20 may include: a first receiving unit 227, a third obtaining unit 228, and a sending unit 226. Optionally, the SFE shown in FIG. 20 further includes a storage unit (not shown in FIG. 20), where the storage unit may be configured to store the first forwarding entry, the second forwarding entry, and the third forwarding entry in Embodiment 1.

The SFE shown in FIG. 20 and the SFE shown in FIG. 5 may be a same apparatus, for example, both are the SFE 22 or the SFE 25 in the network shown in FIG. 19. It may be considered that FIG. 5 shows, from a physical perspective, content included in an SFE, and FIG. 20 shows, from a logical perspective, content included in an SFE. Optionally, the first receiving unit 227 and the sending unit 226 shown in FIG. 20 may be implemented by the communications interface 222 shown in FIG. 5, the third obtaining unit 228 shown in FIG. 20 may be implemented by the processor 220 shown in FIG. 5 according to the executable instruction stored in the memory 221, and the storage unit included in the SFE shown in FIG. 20 may be implemented by the memory 221 shown in FIG. 5.

Content included in the controller in Embodiment 3 from a physical perspective may be the same as the content included in the controller shown in FIG. 16, and details are not described herein.

Figure 21:
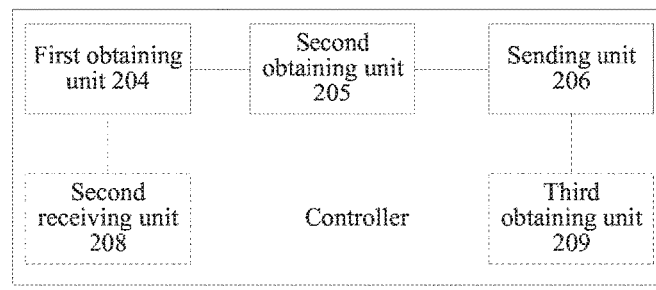
FIG. 21 is a schematic diagram of a controller according to Embodiment 3.

FIG. 21 is a schematic diagram of a controller according to Embodiment 3. The controller shown in FIG. 21 includes: a first obtaining unit 204, a second obtaining unit 205, and a sending unit 206. Optionally, the controller shown in FIG. 21 further includes a second receiving unit 208 and/or a third obtaining unit 209. Optionally, the controller shown in FIG. 21 further includes a storage unit (not shown in FIG. 21), where the storage unit may be configured to store the correspondence stored in the controller 20 in Embodiment 2.

The controller shown in FIG. 21 and the controller shown in FIG. 16 may be a same apparatus, for example, both are the controller 20 in the network shown in FIG. 19. It may be considered that FIG. 16 shows, from a physical perspective, content included in a controller, and FIG. 21 shows, from a logical perspective, content included in a controller. Optionally, the sending unit 206 and the second receiving unit 208 shown in FIG. 21 may be implemented by the communications interface 202 shown in FIG. 16, the first obtaining unit 204, the second obtaining unit 205, and the third obtaining unit 209 shown in FIG. 21 may be implemented by the processor 200 shown in FIG. 16 according to the executable instruction stored in the memory 201, and the storage unit included in the controller shown in FIG. 21 may be implemented by the memory 201 shown in FIG. 16.

Figure 22:
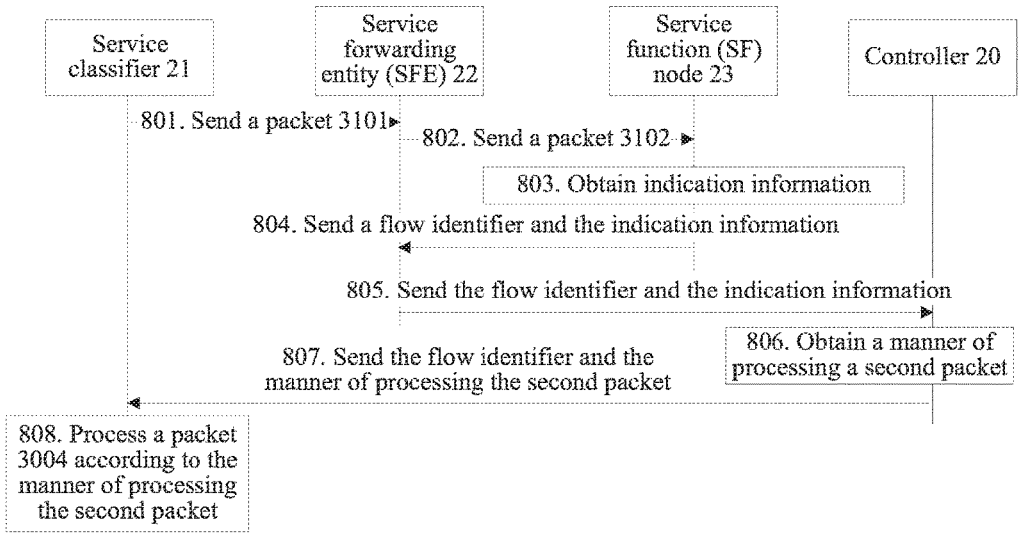
FIG. 22 is a schematic diagram of a method for updating a manner of processing a packet of a service flow according to Embodiment 3.

FIG. 22 is a schematic diagram of a method for updating a manner of processing a packet of a service flow according to Embodiment 3. A control node in Embodiment 3 is a controller 20, and the controller 20 may receive a flow identifier and indication information that are sent by an SFE 22. The method for updating a manner of processing a packet of a service flow provided in Embodiment 3 is described in detail in the following with reference to FIG. 5, FIG. 16, and FIG. 19 to FIG. 21.

801. A service classifier 21 sends a packet 3101 to an SFE 22.

Content included in step 801 in Embodiment 3 is the same as the content included in step 601 in Embodiment 1, and details are not described herein.

802. The SFE 22 sends a packet 3102 to an SF node 23.

Content included in step 802 in Embodiment 3 is the same as the content included in step 602 in Embodiment 1, and details are not described herein.

803. The SF node 23 obtains indication information.

Content included in step 803 in Embodiment 3 is the same as the content included in step 603 in Embodiment 1, and details are not described herein.

804. The SF node 23 sends a flow identifier and the indication information to the SFE 22.

Content included in step 804 in Embodiment 3 is the same as the content included in step 604 in Embodiment 1, and details are not described herein.

805. The SFE 22 sends the flow identifier and the indication information to a controller 20.

For example, a first receiving unit 227 included in the SFE 22 receives the flow identifier and the indication information that are sent by the SF node 23, where the flow identifier and the indication information may be carried in a packet 5201 or a packet 3103. The packet 5201 in Embodiment 3 may be in a format that is the same as that of the packet 3201 in Embodiment 1, the packet 3103 in Embodiment 3 may be in a format that is the same as that of the packet 3103 in Embodiment 1, and details are not described herein.

For example, a third obtaining unit 229 included in the SFE 22 may generate a packet 5202 according to the flow identifier and the indication information, where the packet 5202 is an OF protocol packet or a Diameter protocol packet. A sending unit 226 sends the packet 5202 to the controller 20, so as to send the flow identifier and the indication information to the controller 20 by using the packet 5202.

For example, if the packet 5202 is a Diameter protocol packet, an AVP carried in a Diameter header of the Diameter protocol packet may be in the format shown in FIG. 11. The packet 5202 may be the same as the packet 3201 in Embodiment 1, and details are not described herein.

Figure 23:
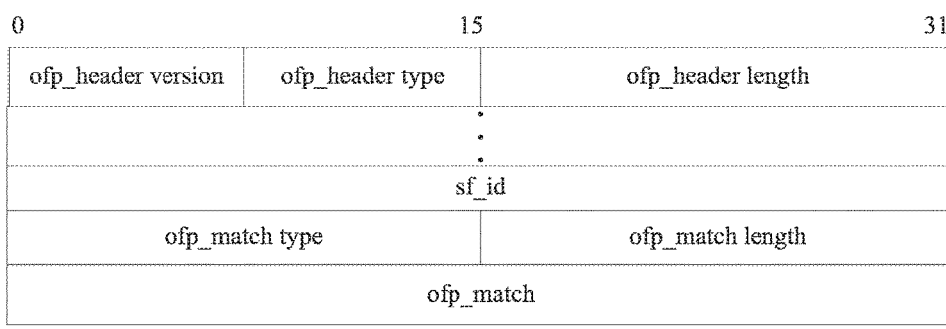
FIG. 23 is a schematic diagram of an OF protocol packet according to an embodiment.
Figure 24:
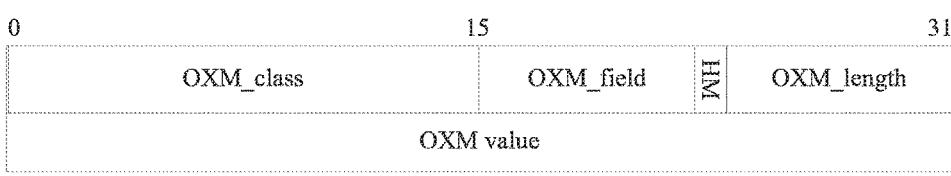
FIG. 24 is a schematic diagram of an OF protocol match field according to an embodiment.

For example, if the packet 5202 is an OF protocol packet, the packet 5202 may be in formats shown in FIG. 23 and FIG. 24. As shown in FIG. 23, an OpenFlow protocol header version (ofp_header version) field is used to identify a version of a packet header of the OF protocol packet. An OpenFlow protocol header type (ofp_header type) field is used to identify whether the OF protocol packet carries the indication information. A service function identifier (sf_id) field is used to identify an SF node that obtains the indication information. An OpenFlow protocol match type (ofp_match type) field is used to identify a structure of a match field. If the ofp_match type is set to OFPMT_OXM, an OpenFlow protocol match (ofp_match) field may be in a format of an OpenFlow extensible match (OXM) field shown in FIG. 24. The OpenFlow extensible match field (OXM_field) shown in FIG. 24 may be used to identify a type of information carried in the OXM field, for example, the OXM_field may be used to identify a parameter included in the flow identifier, the indication information, or the like. An OpenFlow extensible match value (OXM value) field is used to carry the information. For example, if the OXM_field identifies a source IP address in the flow identifier, the OXM value field may carry content of the source IP address; and if the OXM_field identifies the indication information, the OXM value may carry content of the indication information.

806. The controller 20 obtains a manner of processing a second packet.

For example, a second receiving unit 208 of the controller 20 may receive the packet 5202 from the SFE 22. A first obtaining unit 204 may obtain the flow identifier and the indication information from the packet 5202 that is from the SFE 22. That a second obtaining unit 205 obtains the manner of processing the second packet in Embodiment 3 is the same as the content included in step 705 in Embodiment 2, and details are not described herein.

807. The controller 20 sends the flow identifier and the manner of processing the second packet to the service classifier 21.

For example, a third obtaining unit 209 of the controller 20 may obtain a packet 5203 according to the flow identifier and the manner of processing the second packet. A sending unit 206 sends the packet 5203 to the service classifier 21. A format of the packet 5203 may be the same as that of the packet 4202 in Embodiment 2, and details are not described herein.

Content included in step 807 in Embodiment 3 is the same as the content included in step 706 in Embodiment 2, and details are not described herein.

808. The service classifier 21 processes a packet 3004 according to the manner of processing the second packet.

Content included in step 808 in Embodiment 3 is the same as the content included in step 707 in Embodiment 2, and details are not described herein.

In the method provided in Embodiment 3, the controller 22 may obtain, according to the flow identifier and the indication information that are sent by the SFE 22, the manner of processing the second packet. The controller 20 may send the manner of processing the second packet to the service classifier 21, and the service classifier 21 adjusts a manner of forwarding the service flow, which helps adjust forwarding of the service flow according to information about processing the service flow by an SF node.

Optionally, if the processing node is the SFE 22, after step 806, the method provided in Embodiment 3 further includes: sending, by the controller 20, the flow identifier and the manner of processing the second packet to the SFE 22 by using an OF protocol packet. A format of the OF protocol packet sent by the controller 20 to the SFE 22 may be the same as the format of the packet 3202 in Embodiment 1, and details are not described herein. The SFE 22 used as the processing node may process a packet 3104 and a packet 3105 according to the method in Embodiment 1, and details are not described herein.

In the embodiments, an ID of an SF node and a path ID that are included in an SFC header of a packet help an SFE determine a forwarding entry. Content included in the SFC header is not limited to the content mentioned in the foregoing embodiments. In the embodiments, an SFC may also be a service chain (SC), and an SF node may also be a service processing entity (SPE).

In the embodiments, the SFE may modify an ID of an SF node in an SFC header of a packet. Alternatively, an SF node included in an SFC may modify an ID of an SF node in an SFC header of a received packet, and replace the ID of the SF node in the SFC header of the received packet with an ID of the SF node. For example, a packet 3102 sent by an SFE 22 to an SF node 23 is the same as a packet 3101. The SF node 23 replaces a preset value in an SFC header of the packet 3102 with an ID of the SF node 23. In this way, an ID of an SF node in an SFC header of a packet 3103 sent by the SF node 23 to the SFE 22 is the ID of the SF node 23. An SF node 24 and/or an SF node 26 may also use a processing manner that is the same as that of the SF node 23, and details are not described herein.

The foregoing processor may be a microprocessor or the processor may be any conventional processor, decoder, or the like. The steps of the method disclosed with reference to the embodiments may be directly performed by a hardware processor, or may be performed by using a combination of hardware in a processor and a software module. When it is implemented by using software, code that implements the foregoing functions may be stored in a computer-readable medium, where the computer-readable medium includes a computer storage medium. The storage medium may be any available medium accessible to a computer. The following is used as an example but is not limited: The computer readable medium may be a random access memory (RAM), a read-only memory (ROM), an electrically erasable programmable read-only memory (EEPROM), a compact disc read-only memory (CD-ROM) or another optical disk storage, a disk storage medium or another disk storage device, or any other medium that can be used to carry or store expected program code in a command or data structure form and can be accessed by a computer. The computer-readable medium may be a compact disc (CD), a laser disc, a digital video disc (DVD), a floppy disk, or a Blu-ray disc.

Finally, it should be noted that the foregoing embodiments are merely intended for exemplarily describing the technical solutions of the present embodiments rather than limiting the present embodiments. Although the present embodiments and benefit effects of the present embodiments are described in detail with reference to the foregoing embodiments, persons of ordinary skill in the art should understand that they may still make modifications to the technical solutions described in the foregoing embodiments or make equivalent replacements to some technical features thereof; however, these modifications or replacements do not make the essence of corresponding technical solutions depart from the scope of the claims of the present embodiments.

What is claimed is:

1. A method comprising:
obtaining, by a control node, a flow identifier and indication information from a service function (SF) node of a first service function chain (SFC), wherein the indication information indicates a manner of processing a second packet of a service flow, wherein the flow identifier identifies the service flow, and wherein the second packet reaches a processing node later than a first packet;
obtaining, by the control node according to the indication information, the manner of processing the second packet, wherein the manner of processing the second packet does not comprise forwarding the second packet along the first SFC; and
sending, by the control node to the processing node, the flow identifier and the manner of processing the second packet.

2. The method according to claim 1, wherein obtaining, by the control node, the flow identifier and indication information from the service function SF node of the first SFC comprises:
receiving, by the control node, a Diameter protocol packet sent by the SF node, wherein an attribute value pair (AVP) in a Diameter header of the Diameter protocol packet carries the flow identifier and the indication information; and
obtaining, by the control node, the flow identifier and the indication information from the AVP of the Diameter header.

3. The method according to claim 1, wherein the control node is a service forwarding entity (SFE), the SFE is connected to the SF node, and the first packet comprises an SFC header, and wherein obtaining, by the control node, the flow identifier and indication information from the service function SF node of the first SFC comprises:
receiving, by the SFE, a third packet sent by the SF node, wherein the third packet carries the SFC header to which the indication information is added; and
obtaining, by the SFE, the flow identifier and the indication information from the third packet.

4. The method according to claim 1, wherein the control node is a controller, and wherein obtaining, by the control node, the flow identifier and indication information from the service function SF node of the first SFC comprises:
receiving, by the controller, a first OpenFlow (OF) protocol packet sent by an SFE, wherein a payload in the first OF protocol packet carries the flow identifier and the indication information, and wherein the SFE is connected to the SF node; and
obtaining, by the controller, the flow identifier and the indication information from the payload of the first OF protocol packet.

5. The method according to claim 1, wherein obtaining, by the control node according to the indication information, the manner of processing the second packet comprises:
determining, by the control node, a service type of the service flow according to the indication information; and
obtaining, by the control node, an identifier (ID) of a second SFC according to the service type of the service flow, wherein the second SFC is used to forward the second packet.

6. The method according to claim 1, wherein obtaining, by the control node according to the indication information, the manner of processing the second packet comprises:
determining, by the control node, a processing instruction for the second packet according to the indication information, wherein the processing instruction is to discard the second packet or to skip the SF node.

7. The method according to claim 1, wherein the processing node is a service classifier, and wherein sending, by the control node, the flow identifier and the manner of processing the second packet to the processing node comprises:
obtaining, by the control node, a second OF protocol packet, wherein a payload in the second OF protocol packet carries the flow identifier and the manner of processing the second packet; and
sending, by the control node, the second OF protocol packet to the service classifier.

8. A method comprising:
receiving, by a service function (SF) node on a first service function chain (SFC), a first packet sent by a service forwarding entity (SFE), wherein the SFE is connected to the SF node, the first packet comprises a flow identifier, and the flow identifier identifies a service flow;
processing, by the SF node, the first packet to obtain indication information, wherein the indication information indicates a manner of processing a second packet of the service flow, wherein the manner of processing the second packet of the service flow does not comprise forwarding the second packet along the first SFC, and wherein the second packet reaches a processing node later than the first packet; and
sending, by the SF node to a control node, the flow identifier and the indication information.

9. The method according to claim 8, wherein sending, by the SF node, the flow identifier and the indication information to the control node comprises:
obtaining, by the SF node, a Diameter protocol packet, wherein an attribute value pair (AVP) in a Diameter header of the Diameter protocol packet carries the flow identifier and the indication information; and
sending, by the SF node to the control node, the Diameter protocol packet.

10. The method according to claim 8, wherein the first packet comprises an SFC header, and wherein sending, by the SF node, the flow identifier and the indication information to the control node comprises:
obtaining, by the SF node, a third packet, wherein the third packet carries the SFC header; and
sending, by the SF node to the SFE, the third packet, wherein the SFE is the control node or the SFE is connected to the control node.

11. A control node comprising:
a processor; and
a non-transitory computer readable storage medium storing a program for execution by the processor, the program including instructions to:

obtain a flow identifier and indication information from a service function (SF) node of a first service function chain (SFC), wherein the flow identifier identifies a service flow, wherein the indication information is used to indicate a manner of processing a second packet of the service flow, and wherein the second packet reaches a processing node later than a first packet;

obtain, according to the indication information, the manner of processing the second packet, wherein the manner of processing the second packet does not comprise forwarding the second packet along the first SFC; and send the flow identifier and the manner of processing the second packet to the processing node.

12. The control node according to claim 11, wherein the instructions further comprise instructions to:

receive a Diameter protocol packet sent by the SF node, wherein an attribute value pair (AVP) in a Diameter header of the Diameter protocol packet carries the flow identifier and the indication information; and obtain the flow identifier and the indication information from the AVP of the Diameter header.

13. The control node according to claim 11, wherein the control node is a service forwarding entity (SFE), the SFE is connected to the SF node, and the first packet comprises an SFC header, and wherein the instructions further comprise instructions to:

receive a third packet sent by the SF node, wherein the third packet carries the SFC header to which the indication information is added; and obtain the flow identifier and the indication information from the third packet.

14. The control node according to claim 11, wherein the control node is a controller, and wherein the instructions further comprise instructions to:

receive a first OpenFlow (OF) protocol packet sent by an SFE, wherein a payload in the first OF protocol packet carries the flow identifier and the indication information, and the SFE is connected to the SF node; and obtain the flow identifier and the indication information from the payload of the first OF protocol packet.

15. The control node according to claim 11, wherein the instructions further comprise instructions to:

determine a service type of the service flow according to the indication information; and obtain an identifier (ID) of a second SFC according to the service type of the service flow, wherein the second SFC is used to forward the second packet.

16. The control node according to claim 11, wherein the instructions further comprise instructions to:

determine a processing instruction for the second packet according to the indication information, wherein the processing instruction is to discard the second packet or skip the SF node.

17. The control node according to claim 11, wherein the processing node is a service classifier, and wherein the instructions further comprise instructions to:

obtain a second OF protocol packet, wherein a payload in the second OF protocol packet carries the flow identifier and the manner of processing the second packet; and send the second OF protocol packet to the service classifier.

18. A service function (SF) node comprising:

a processor; and a non-transitory computer readable storage medium storing a program for execution by the processor, the program including instructions to:

receive a first packet sent by a service forwarding entity (SFE), wherein the SFE is connected to the SF node, the first packet comprises a flow identifier, and the flow identifier identifies a service flow;

process the first packet to obtain indication information, wherein the indication information indicates a manner of processing a second packet of the service flow, wherein the manner of processing the second packet of the service flow does not comprise forwarding the second packet along a first service function chain (SFC), and wherein the second packet reaches a processing node later than the first packet; and send the flow identifier and the indication information to a control node.

19. The SF node according to claim 18, wherein the instructions further comprise instructions to:

obtain a Diameter protocol packet, wherein an attribute value pair (AVP) in a Diameter header of the Diameter protocol packet carries the flow identifier and the indication information; and send the Diameter protocol packet to the control node.

20. The SF node according to claim 18, wherein the first packet comprises an SFC header, and wherein the instructions further comprise instructions to:

obtain a third packet, wherein the third packet carries the SFC header to which the indication information is added; and send the third packet to the SFE, wherein the SFE is the control node or the SFE is connected to the control node.

* * * * *